United States Patent [19]

Oliver

[11] Patent Number: 4,839,917
[45] Date of Patent: Jun. 13, 1989

[54] UNIVERSAL LINE STATUS MONITORING AND RESPONSE SYSTEM

[76] Inventor: Stewart W. Oliver, 688 Mildred Ave., Venice, Calif. 90291

[21] Appl. No.: 116,066

[22] Filed: Oct. 29, 1987

[51] Int. Cl.⁴ .................... G08B 26/00; G08B 1/08; H04M 11/04
[52] U.S. Cl. .................................... 379/45; 379/33; 379/49
[58] Field of Search ............ 379/45, 28, 32, 33, 379/49, 37; 340/518, 653, 660

[56] References Cited

U.S. PATENT DOCUMENTS

| | | | |
|---|---|---|---|
| 2,195,627 | 4/1940 | Lomax et al. | 179/5 |
| 3,571,531 | 3/1971 | Rubin | 179/175.2 |
| 3,917,915 | 11/1975 | Karras | 179/175.2 |
| 4,273,960 | 6/1981 | Fahey et al. | 179/5 |
| 4,692,742 | 9/1987 | Raizen et al. | 379/49 |

Primary Examiner—Stafford D. Schreyer
Attorney, Agent, or Firm—John E. Wagner

[57] ABSTRACT

A system is disclosed for monitoring telephone lines by bridging across each line between a telephone central office or private branch exchange (PBX) and a telephone set. The lines are scanned periodically for OFF-HOOK, DIALING or IN-RING condition to determine line status. OFF-HOOK without DIALING or IN-RING condition for more than a preselected period is considered one form of an alarm condition. Dialing signals of certain predetermined numbers is considered an alarm. A computer is provided to store line status information, preset numbers, personel identification (PIN) numbers and telephone set locations to provide a universal software controlled monitoring of locations, telephone sets and personnel whereever telephone sets are located.

26 Claims, 25 Drawing Sheets

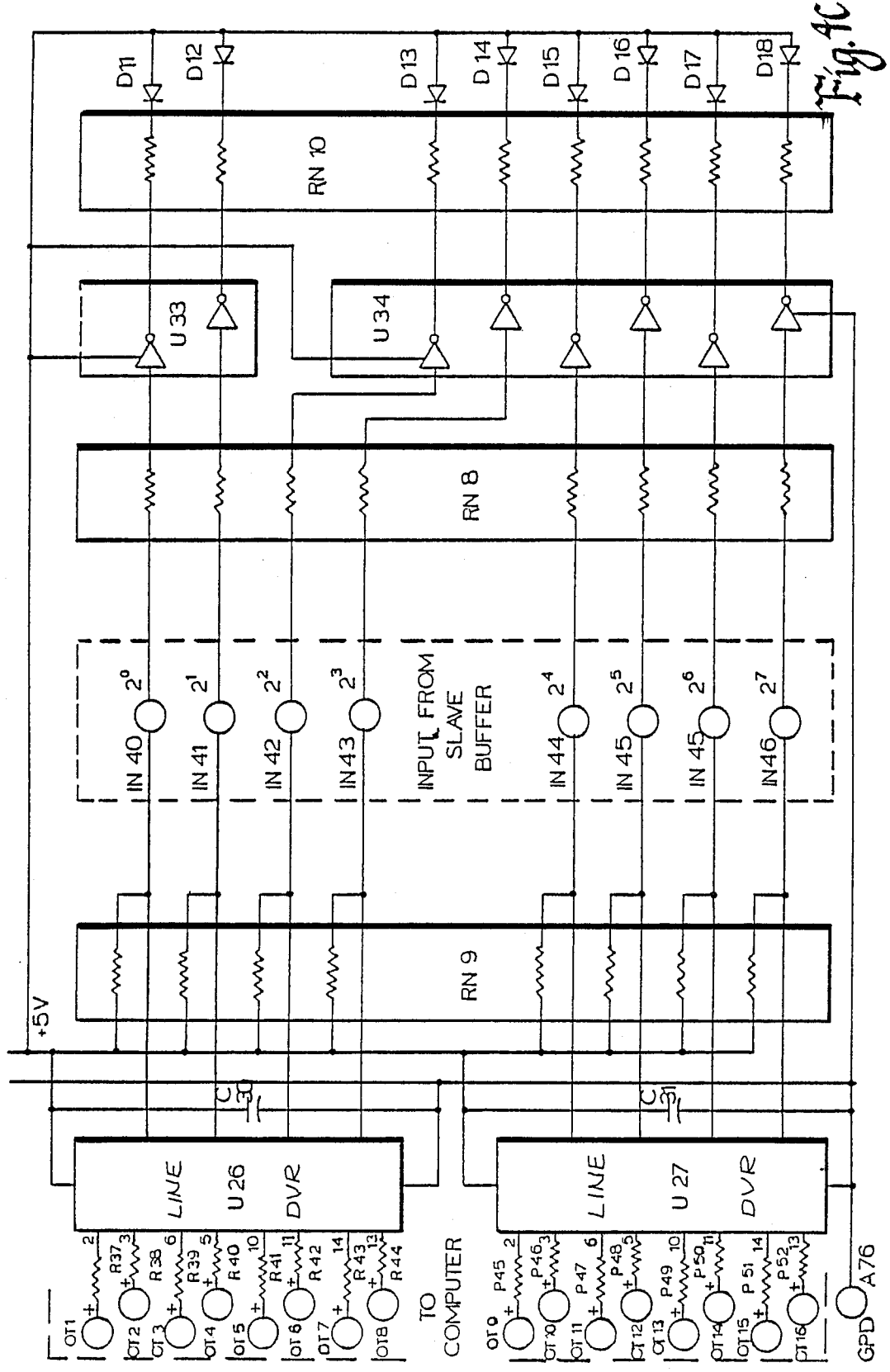

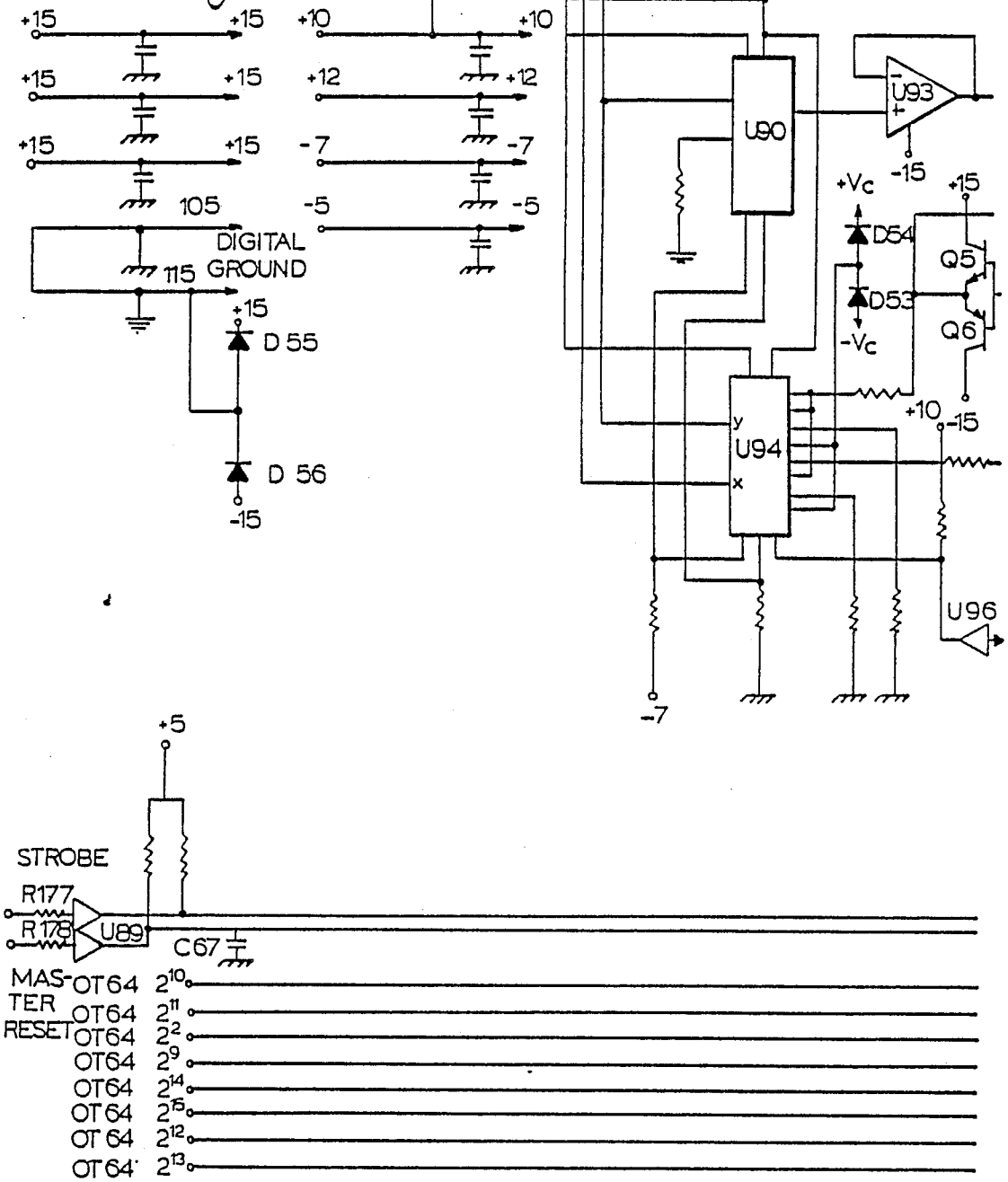

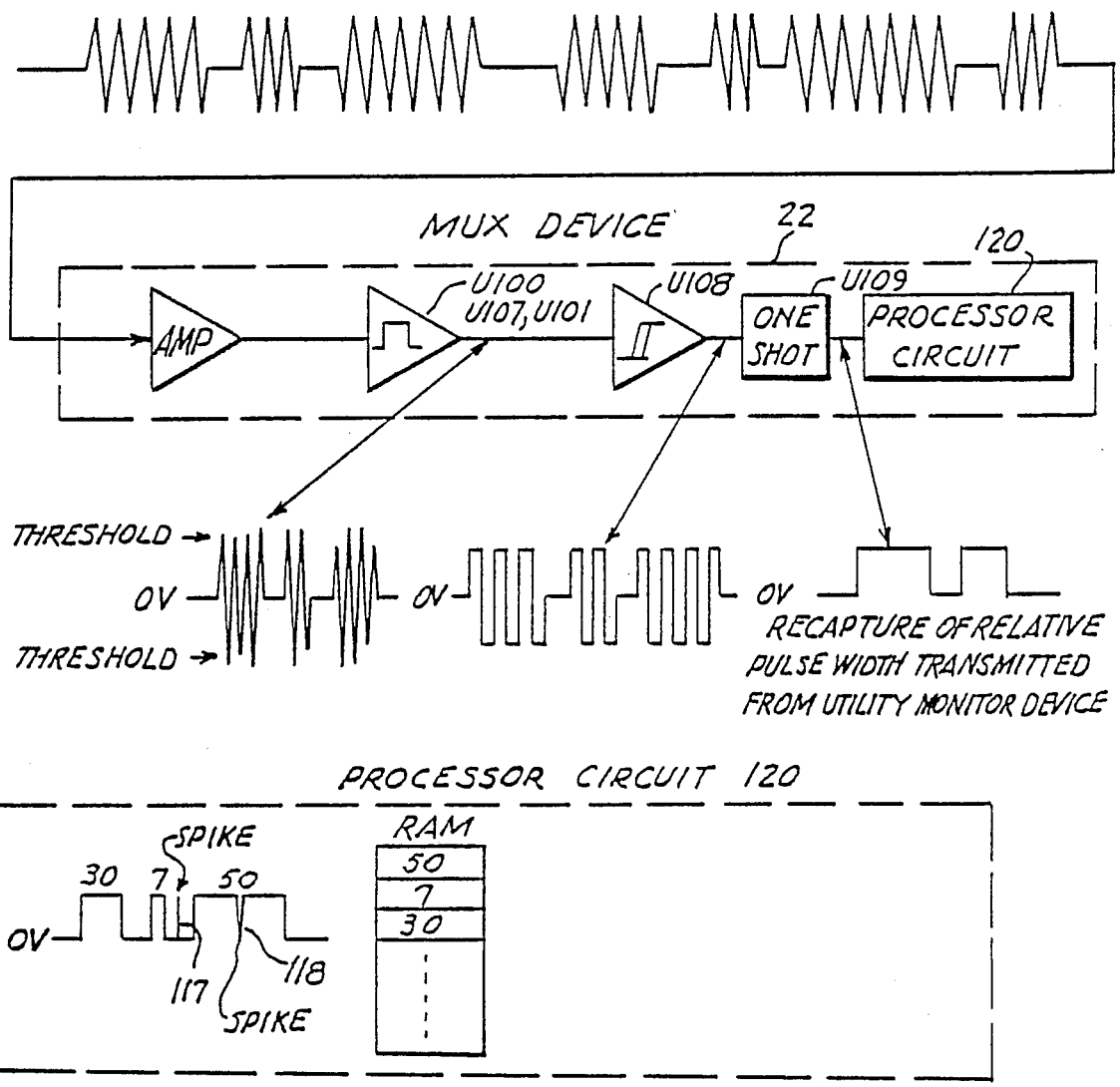

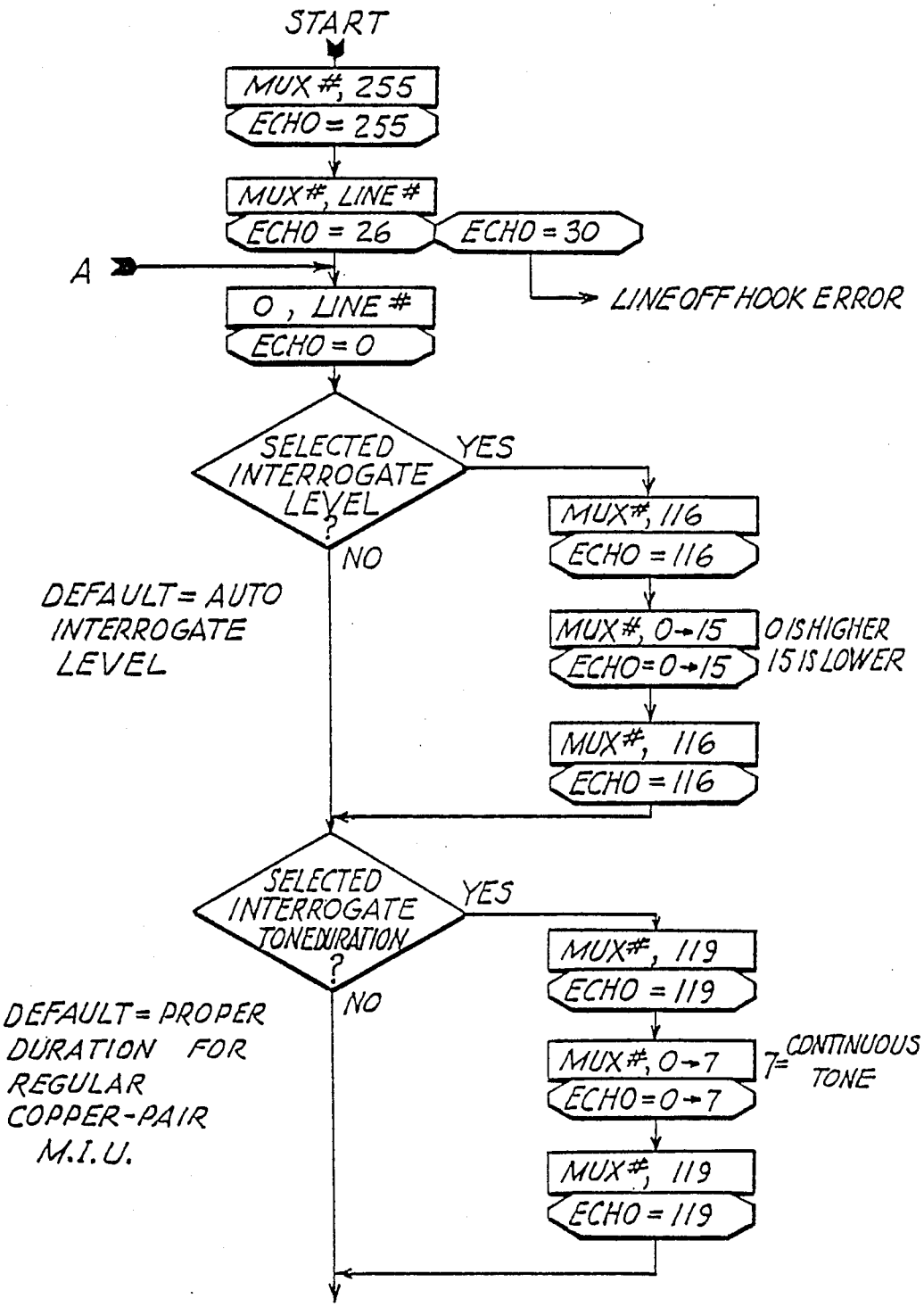

| FIG. 6A | FIG. 6B | FIG. 6C | FIG. 6D |
|---------|---------|---------|---------|
| FIG. 6E | FIG. 6F | FIG. 6G | FIG. 6H |

UNIVERSAL LINE STATUS MONITORING AND RESPONSE SYSTEM

BACKGROUND OF THE INVENTION

For many years, there has been a real interest in two different but related needs with respect to the telephone system. One has been for the telephone operating company to monitor the quality of telephone service from both the equipment and personnel standpoint. This has given rise to a number of systems for unobtrusively monitoring a line which is not in service by effectively seizing the line, placing test signals on the line and monitoring their quality. Other systems operate with the line in an OFF-HOOK condition, similarly placing a test signal on the line and monitoring its quality. In the case of personnel performance monitoring, conformance with established procedures and policies by operating personnel can be evaluated. Both of these monitoring type systems seek to remain unobstrusive so as to avoid interference with normal usage of the line or the privacy of the customer or employee.

More recently, systems have been developed for observing the quality of telephone service which includes a system for monitoring a large number of lines and for detecting when they go into use, to discriminate between incoming or outgoing calls and for recording data related to the line including elapsed time for various uses. Such a system is present in U.S. Pat. No. 3,917,915 to E. C. Karras.

A further refinement in telephone service monitoring apparatus is disclosed in U.S. Pat. No. 3,571,531 to H. Rubin et al. In this system, a monitor station includes a voice frequency monitoring headset, an alpha numeric printer, display lamps and is associated with a touch tone signal receiver register and translator for determining numbers dialed. The system responds to either an originating call or a terminating call (outgoing or incoming).

A related type of system involves the need to utilize the existing telephone system as an alarm reporting system, either manually or automatically.

The desirability of combining an alarm system with a telephone system has been recognized from the early days of the telephone. By 1940, technology had reached the level of producing an alarm system which upon a door opening condition is sensed and through a relay system is indicated as an alarm condition at a central operator station. Alarm recording apparatus allowed the identification of the reporting station. Such a system is disclosed in U.S. Pat. No. 2,195,627 to C. E. Lomax et al.

One sophisticated combined telephone and alarm system is disclosed in U.S. Pat. No. 4,273,960 to R. J. Fahey in which the system determines the status of the telephone line, either ON-HOOK or OFF-HOOK, and employing a timer, monitors activity of a living space. Non-activity such as non-use of the telephone or non-movement for preselected time periods is considered as an alarm condition and alerts an alarm monitoring station. Use of the telephone resets the timer. The U.S. Pat. No. 4,273,960 incorporates by reference portions of the disclosure of U.S. Pat. No. 4,259,548 of R. J. Fahey et al and discusses previous U.S. Pat. Nos. 3,885,235, 3,989,900, 4,121,160 and 4,134,108 having related features, all suitable for health care facilities when non invasive monitoring of resident's activity is desired for the resident's own well being.

These systems have not usually be considered related, however, they employ the tip and ring connections to a subscriber station to provide a non interfering subscriber status information channel. Each of these systems have been configured to fill the specific objective of the designer and lack the versatility of allowing the system user to configure the system to future needs or to allow system operation to be totally changed via software changes.

BRIEF DESCRIPTION OF THE INVENTION

Faced with the foregoing state of the art of combined telephone and line status monitoring systems, I have developed a universal system comprising hardware microprocessor and software elements which together provide a versatile system utilizing existing telephone lines as the communication medium, and with no additional apparatus located at the subscriber station.

The system, which may be called a universal line status monitor and response system, is particularly suited to situations where a person at a remote location might need to signal personnel at a central location for assistance due to a number of possible circumstances. One example is an institution such as a correctional facility where personnel are constantly exposed to potential danger from hostile inmates, and a telephone is normally available.

Another example application is in a hotel or large industrial complex where a mobile work force such as maids or maintenance personnel move about the facility regularly. At present, a housekeeper or supevisor must physically find the person to convey a message or supervise progress. Sometimes the personnel will call in and tell their whereabouts, usually when they are in need of assistance or material.

Employing this invention, such mobile personnel are each assigned a personnel identification number (PIN) and are directed to report in at their present location merely by dialing in their personal identification number on the nearest telephone. The system enters the time, telephone extension and PIN in the computer member for status, accounting or supervisory purposes.

In accordance with another aspect of this invention, additional signalling devices may be bridged across the telephone line to be actuated by some local occurrence such as a switch closure, to seize the line momentarily, (whether in On-hook or Off-hook condition) and send a predetermined multi-frequency code. Additional signal devices may be used.

All of the above are all accomplished without use of local power or the central office or the PBX switch, and without interference with normal telephone usage, save possible multifrequency tones from the subset or additional signalling device superimposed upon speech for a very brief period.

The alarm function can be instigated in many ways, two of which are:

OFF-HOOK ALARM OPTION

An alarm condition can be reported if any telephone instrument included in the system is taken to the Off-Hook state, where there is no incoming call and no dialing sequence follows within a prescribed time (usually 5 to 10 seconds).

DIAL-IN ALARM OPTION

An alarm condition can also be reported if any of several prescribed code numbers is dialed on any telephone instrument included in the system. Examples are: 222=fire; 333=send help.

If either of these alarm conditions occur, the alarm system will provide as an output, an identifying number unique to the telephone which caused the alarm (typically the telephone number of extension number of a PBX installation), a code describing the type of alarm (Off-Hook or Dial-In) and, if desired, any pertinent geographical data describing the particular location of the alarming telephone. An example is a complete route map can be automatically generated or, in the case of medical facilities, a patient history can be reproduced.

The invention described here is, therefore, an improvement which provides the capability to detect and report an unlimited number of simultaneous or otherwise alarm reporting telephones and provide complete geographical or other pertinent information on each one allowing tailored response effort to proceed directly to the site with a minimum of critical time lost. In addition, the system is completely stand-alone requiring only the physical telephone line pairs, the existing telephone instruments, and the normal 24 or 48 Vdc station loop battery feed from the telephone switch for operation.

This enables the system to be used with virtually any telephone switching system manufactured in the past, currently, or expected in the foreseeable future. This invention is as compatible with existing telephone system as a standard telephone and therefore may be easily added to existing systems.

The line status monitor system of this invention is an adaptable telephone line "watchdog" which can provide real time information detailing the use of telephone instruments in either private or public switched network exchanges.

The system scans all connected telephone lines over 250 times each second recording each lines current status (on hook, off hook, ringing or dialing). This status information is processed and used internally to establish a detailed account of each incident of telephone usage.

This usage data is transferred to a host computer via a high speed digital interface for addition to a larger data base record which can be maintained for each line desired. Telephone usage data consisting of such useful information as the time of day and durations of all calls received or originated plus a complete record of all numbers dialed can be complied for unlimited time periods.

The line status monitor can also be programmed to watch for the occurrence of particular events and instantaneously report them to the host computer for selective storage or alarm generation. Examples of such events include dialing particular numbers or area codes, calls exceeding an allowed time duration, telephones off-hook too long without dialing.

The system connects to each telephone line using a high impedance tip and ring bridge tap. It is a completely self-contained system which does not interface with the telephone switch itself. It monitors the signalling protocol between the switch and each telephone instrument and provides compatiblity with virtually all manufacturer's PBX or central switches designed for use with standard type 2500 telephones.

The system for this invention is a computer peripheral system designed to be compatible with a host computer capable of supporting 16 outgoing and 8 incoming TTL compatible, digital I/O lines.

Connection is made via a standard 25 pin female RS-232 type connector.

The heart of the system is the line status monitor (LSM) circuit card. This card contains 16 telephone line interface circuits, a multiplexor system, a microprocessor with up to 16K bytes of static RAM and 32K of bytes of non-volatile program memory. This architecture allows each line status monitor card to operate independently, minimizing the effect an individual card failure will have on a system. Diagnostic aids are provided which help identify a failed card and facilitate service restoral. In a typical installation up to 20 of the LSM cards fit into a 19" rack mount card cage fitted with a wire-wrap backplane to which the tip and ring pairs of all telephone lines to be monitored are connected. A fully populated card cage will monitor 320 telephone lines. Up to twelve card cages can be supported by a single host computer allowing a 3,820 telephone line maximum per system.

Each card cage in a given system is programmed during manufacture with LSM card slot addresses corresponding to the card cage number. (Card Cage 1 contains LSM card slot addresses 1–20, Card Cage 2 contained addresses 21–40, etc.). These addresses are used by the host computer to select individual LSM cards for information transfer. Since these addresses are built into the card cage the addition or replacement of LSM cards is simplified because all cards are identified and no individual configuration is required. This features greatly reduces the change of error during card replacement insuring minimal system down time.

Card Cage No. 1 is termed the "Master" card cage. All data transferred between the host computer and the entire system passes through this case via the "Master Digital Interface Card". The Master Digital Interface Card is installed in the 22nd slot of Card Cage No. 1. It is a digital data transceiver which receives data from and transmits data to the host computer through the 25 pin socket connector mounted in the rear of Card Cage No. 1.

All other card cages, termed "slave" cages, use a "Slave Digital Interface Card" installed in card slot 22. Data is transferred between each card cage through a Cage Interconnect Cable. One cable is required for each slave card cage.

Each card cage typically has slot 21 reserved for a "Voltage Reference Card". This circuit card provides the adjustable voltage references used by the Off-Hook and Ring Detect circuits on the LSM cards. These reference voltages are preset during manufacture and should never require re-adjustment.

BRIEF DESCRIPTION OF THE DRAWING

This invention may be more clearly understood by the following detailed description and by reference to the drawings in which:

FIG. 12 is a layout diagram for FIG. 9

FIG. 13 is a flow diagram for the remote alarm clearing option of this invention;

FIG. 14 is a flow diagram for the personnel tracking option; and

FIG. 15 is a flow diagram for the inactivity report option of this invention.

DETAILED DESCRIPTION OF THE INVENTION

Figure 1:
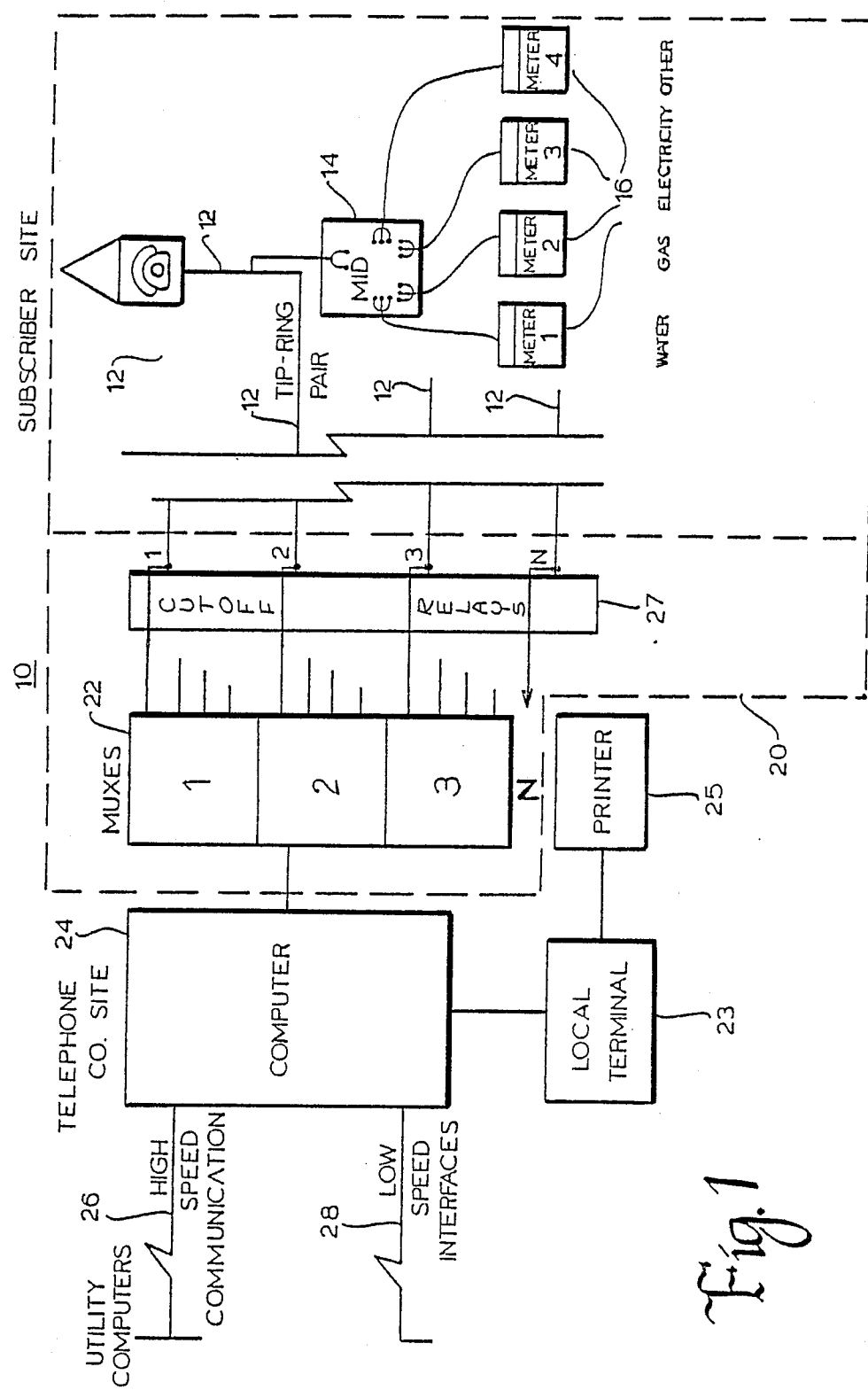
FIG. 1 is a simplified block diagram of the integrated telephone alarm system of this invention.
Figure 2:
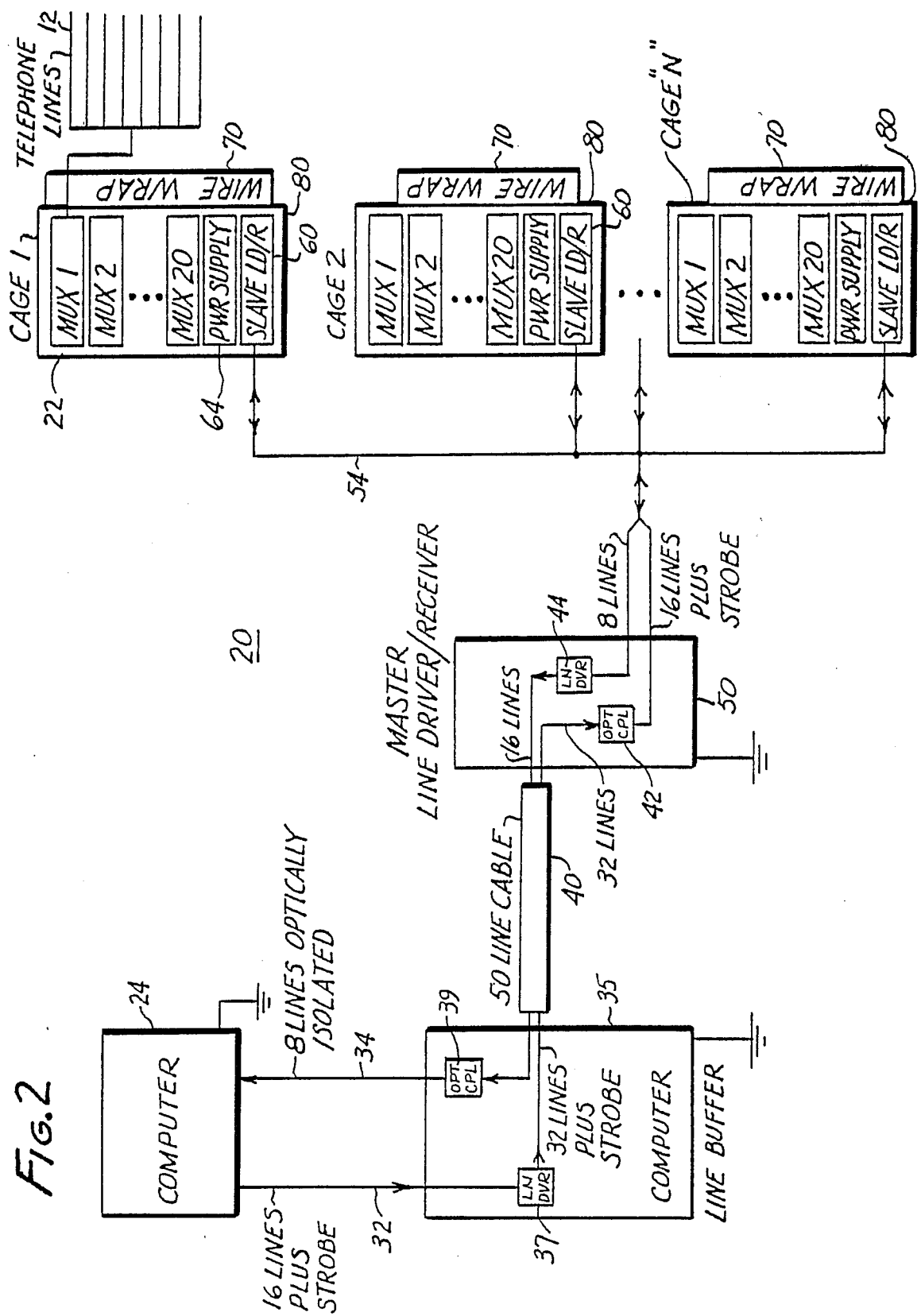
FIG. 2 is a simplified block diagram of the line status monitor card array.
Figure 3A:
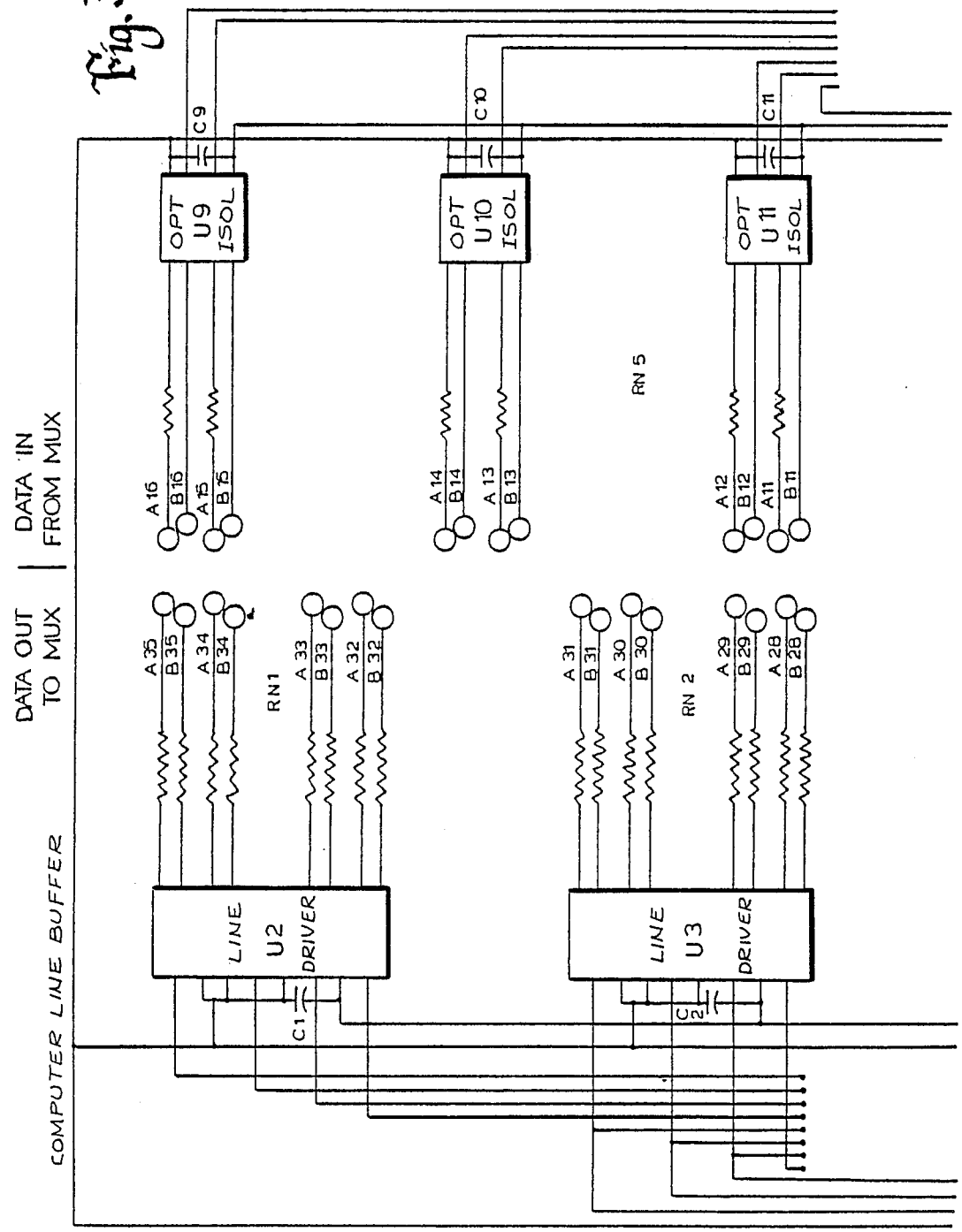
FIG. 3 is a flow diagram of the OFF-HOOK and DIAL-IN alarm feature of this invention.
Figure 3B:
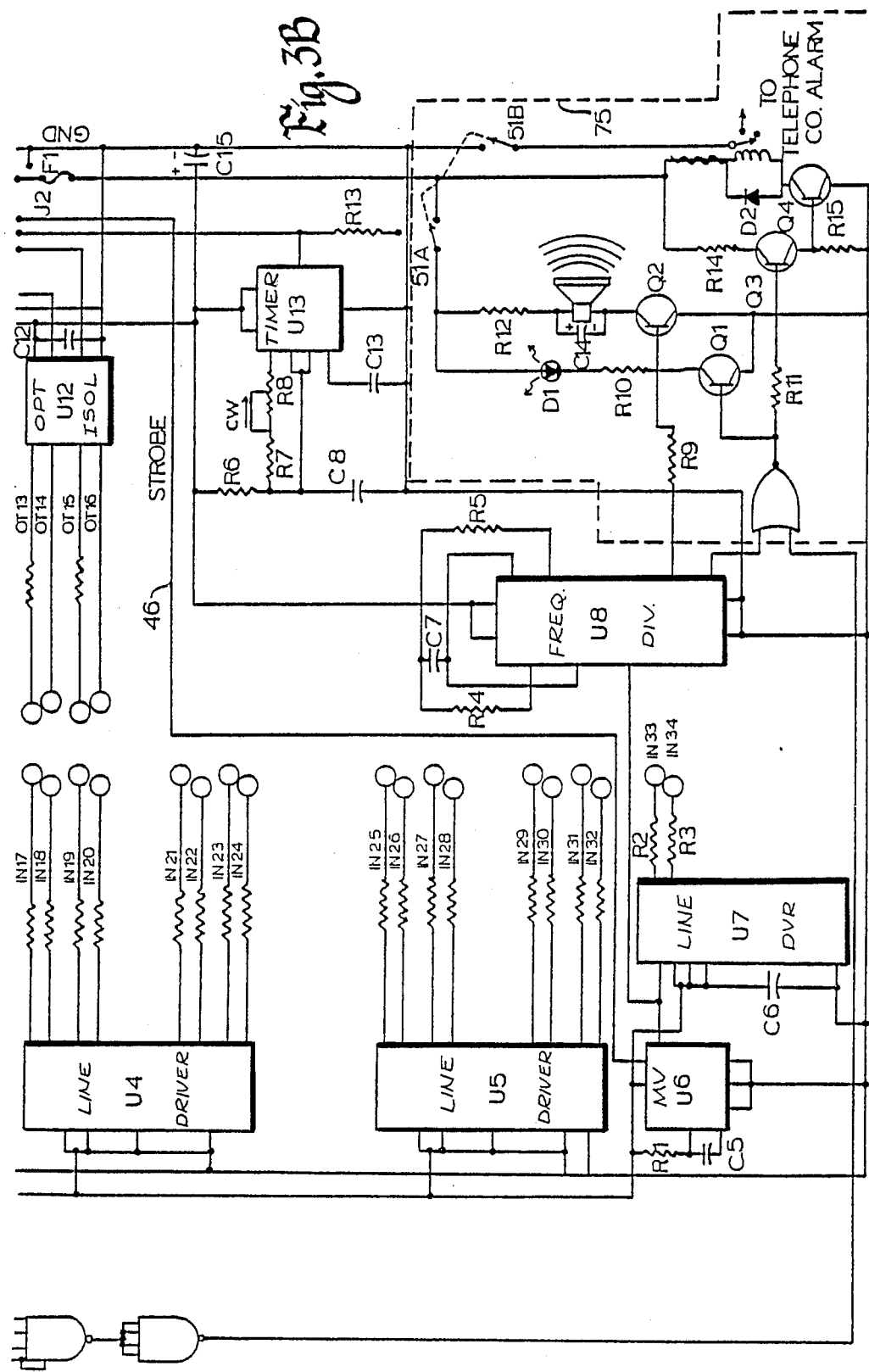
Figure 4A:
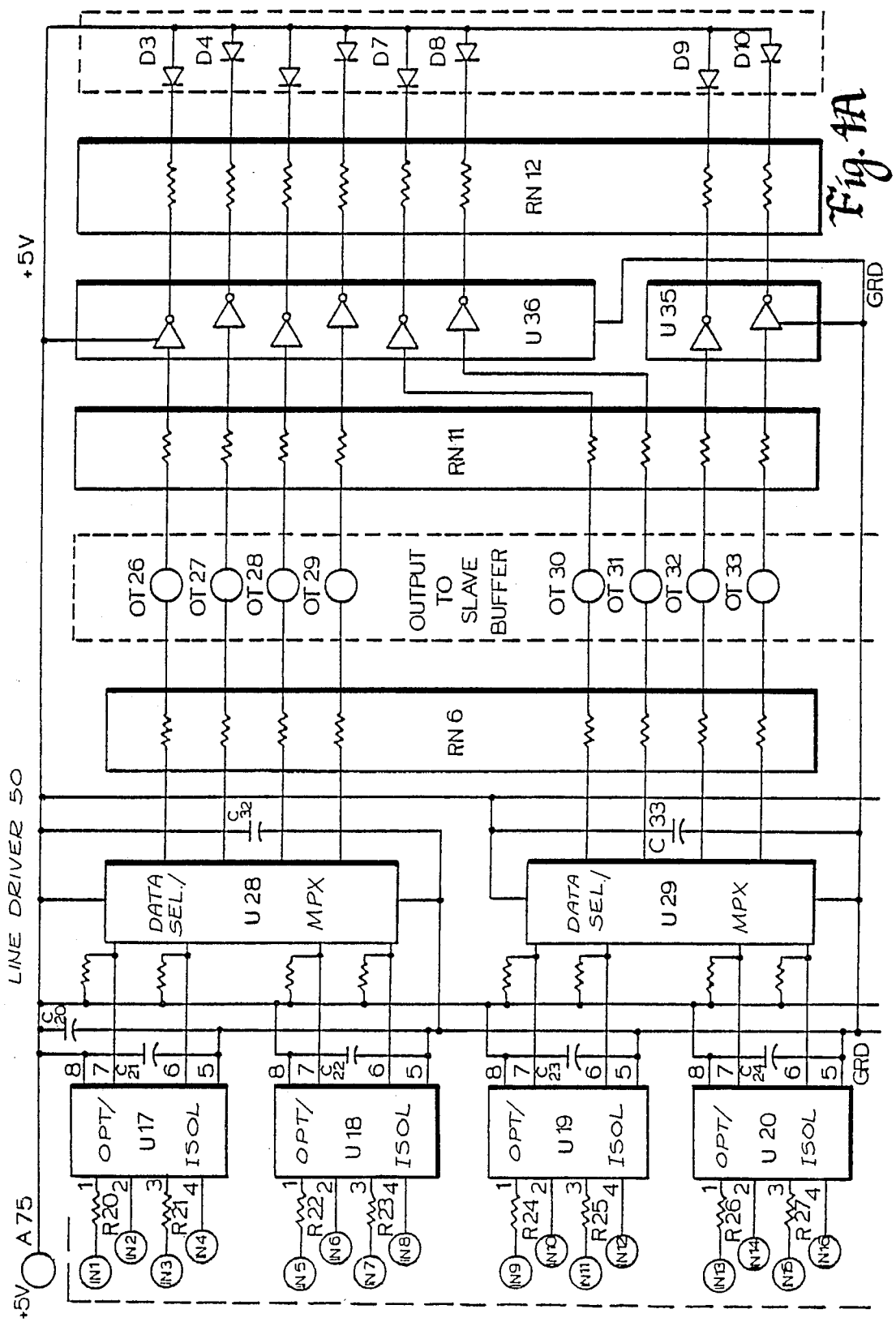
FIG. 4 is a simplified block diagram of the multiplexer and line status computer sections of this invention.
Figure 4B:
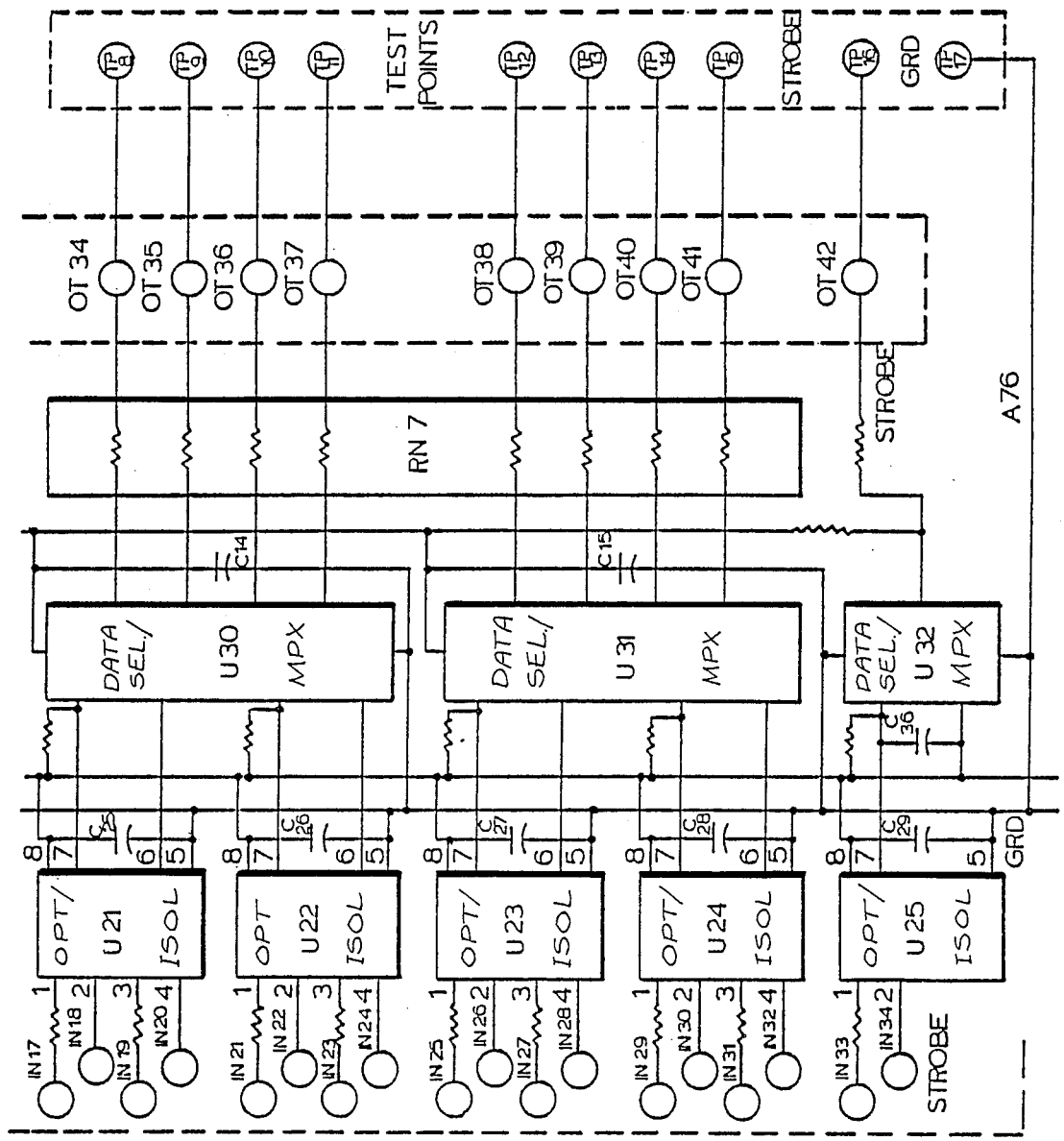
Figure 5A:
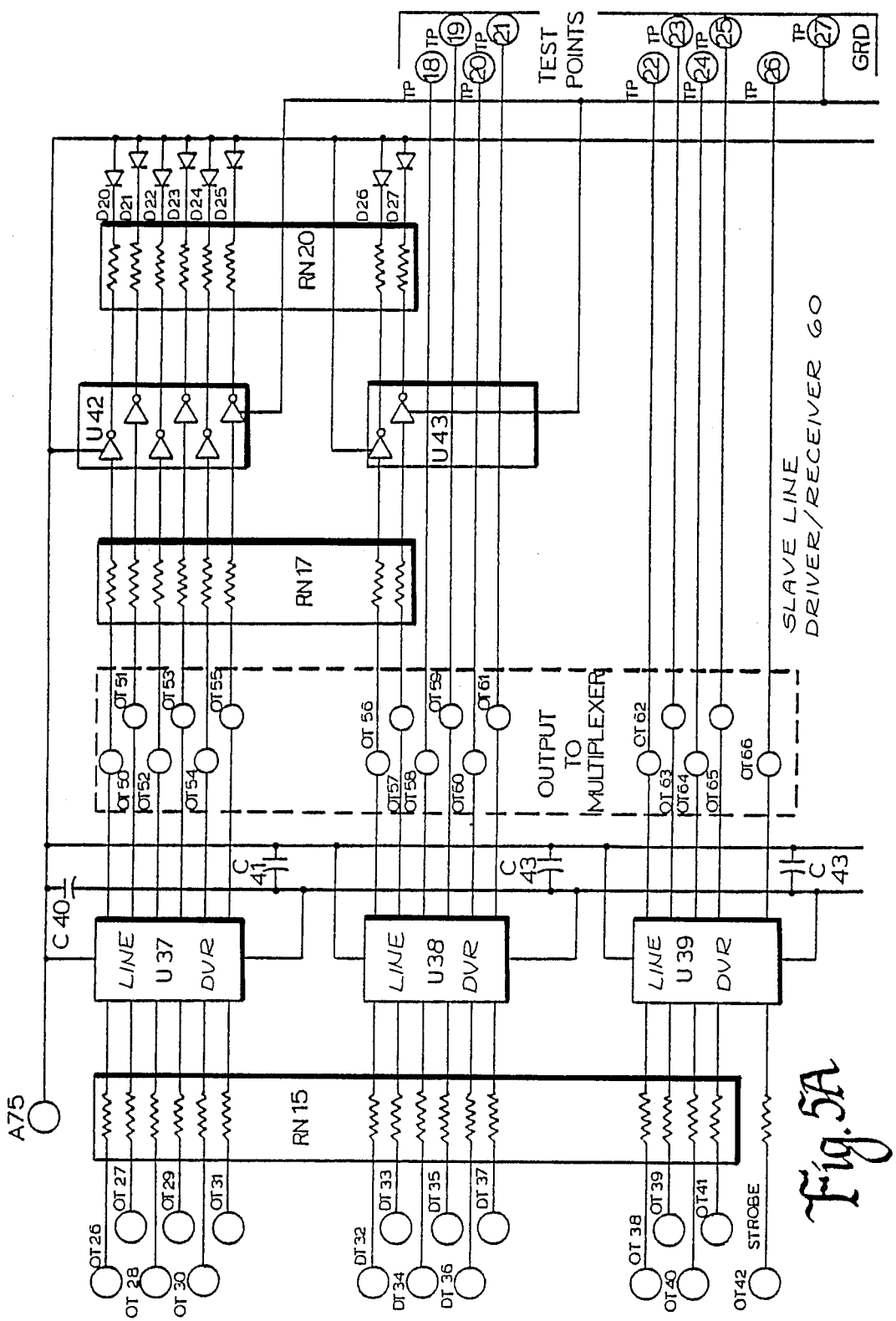
FIG. 5 is an electrical schematic diagram of the voltage reference circuit of this invention.
Figure 5B:
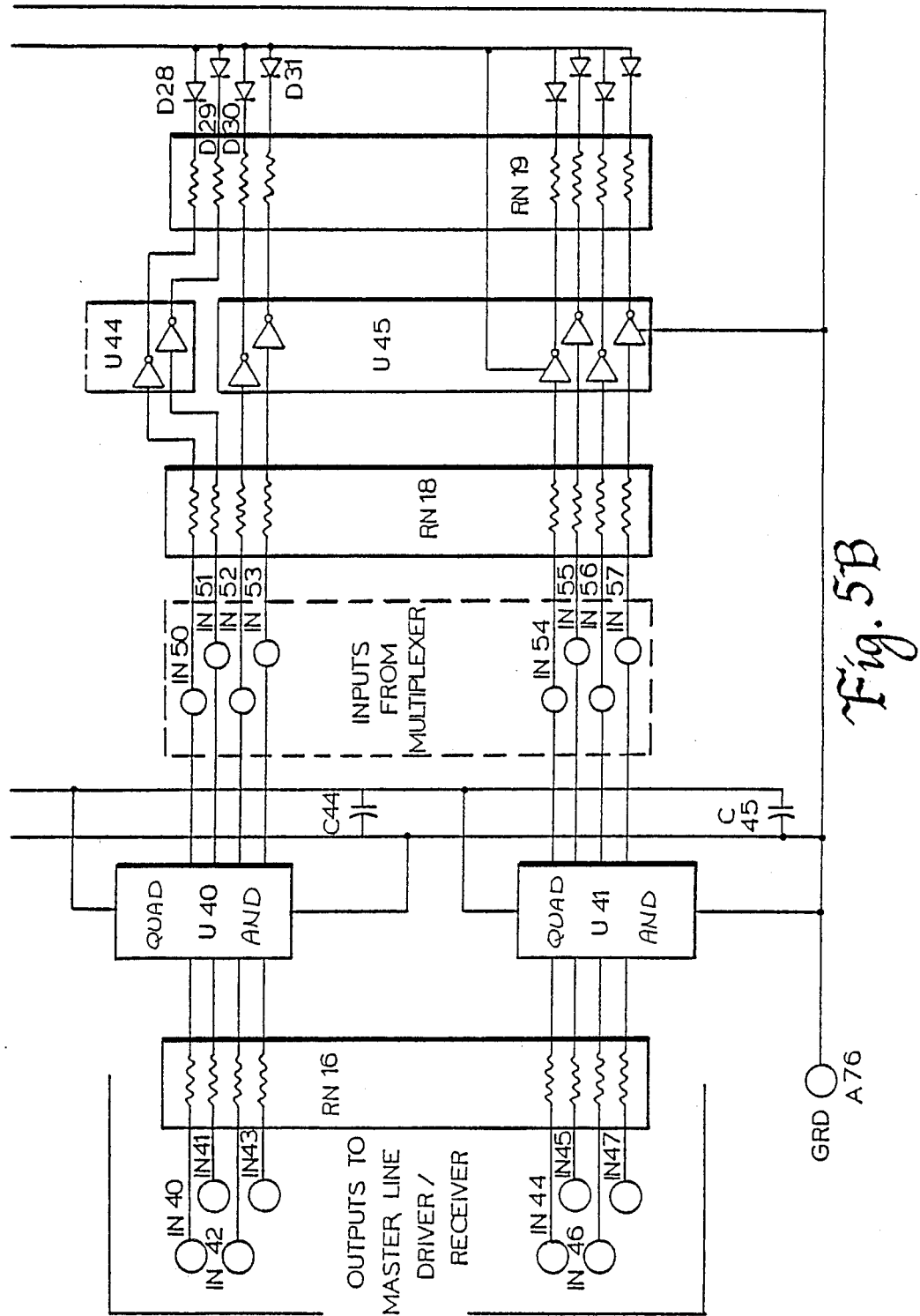
Figure 6A:
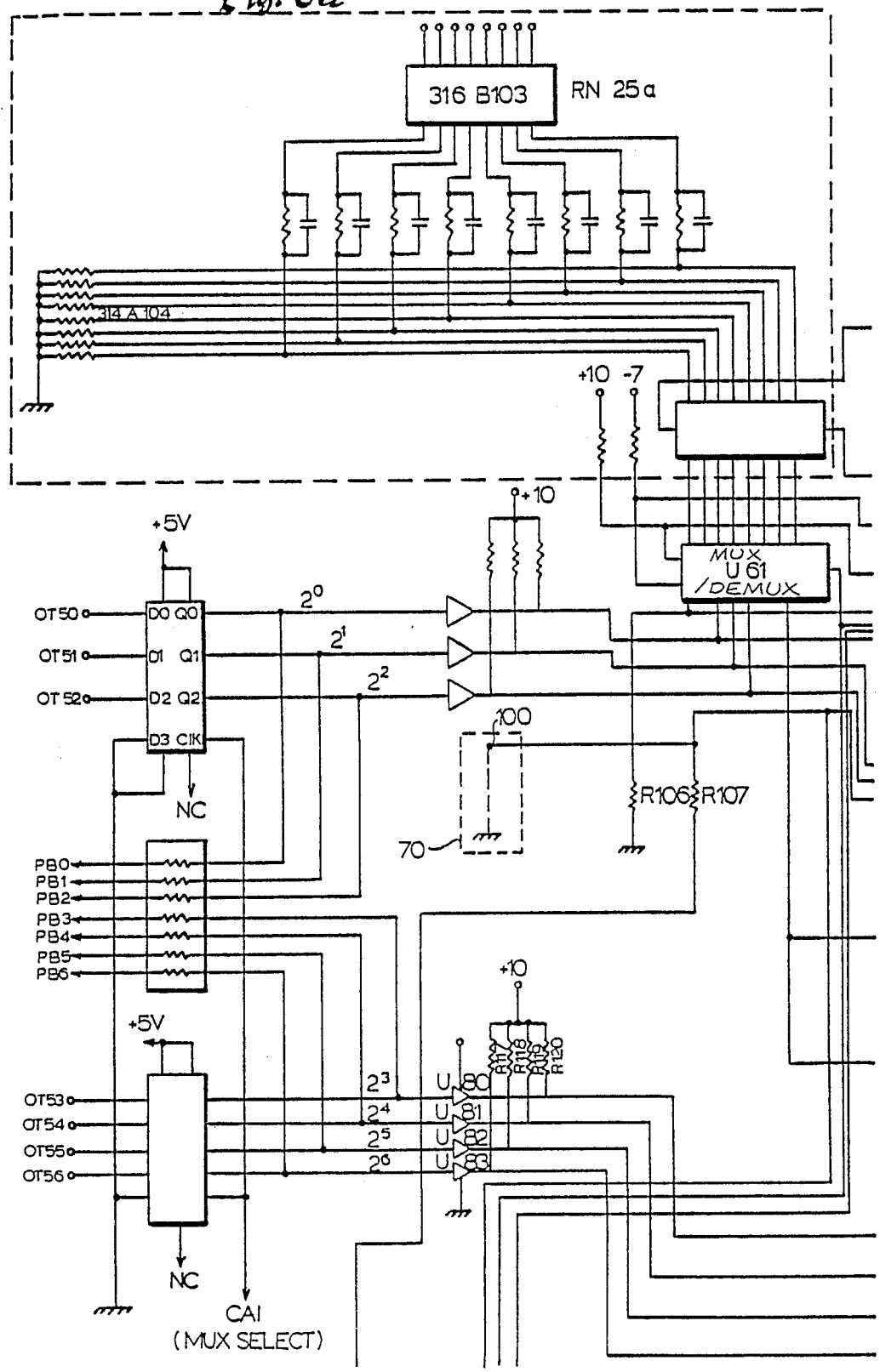
FIGS. 6 and 7 are a simplified electrical schematic diagram of the line circuits of a line status monitor card in accordance with this invention.
Figure 6B:
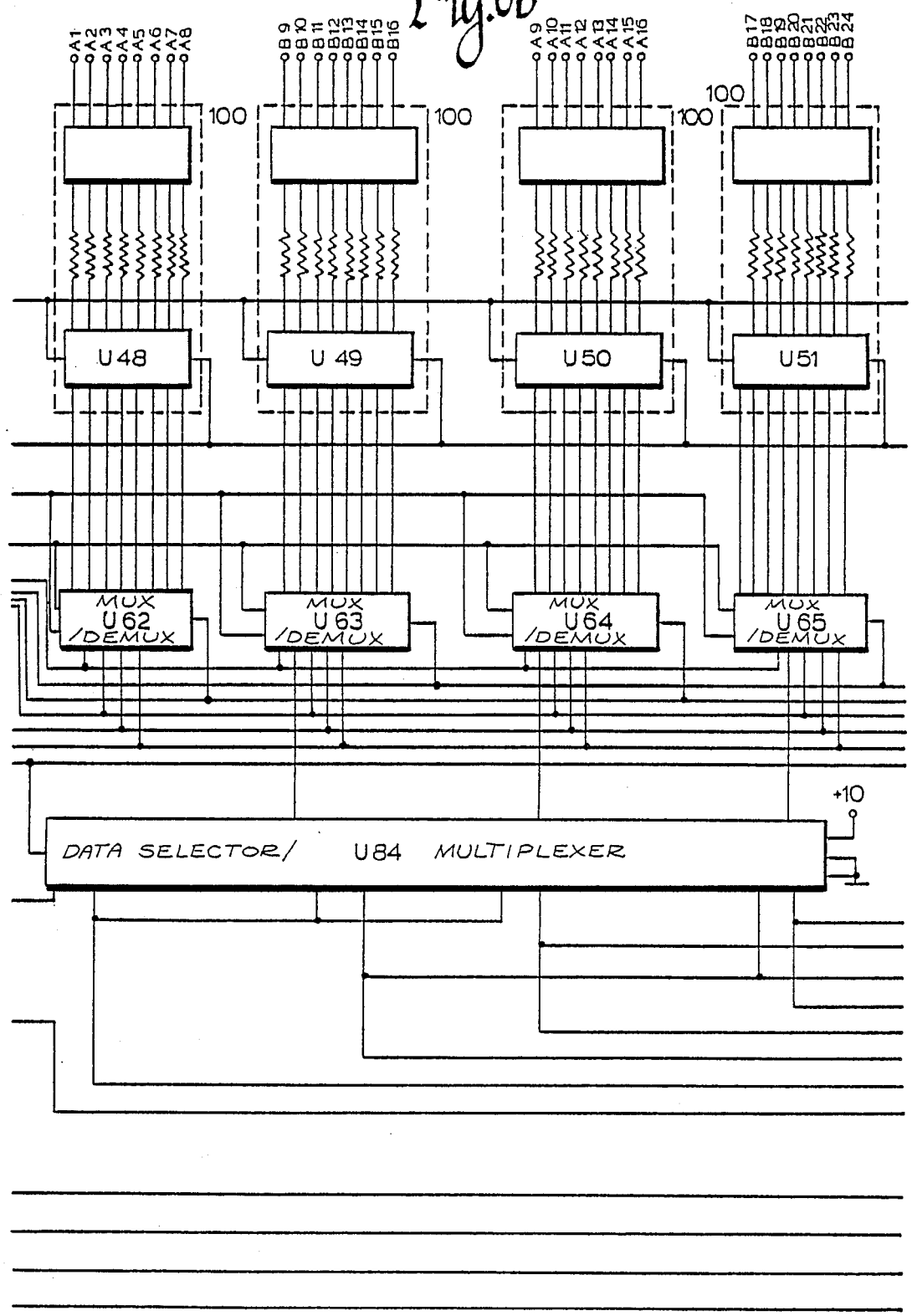
Figure 6C:
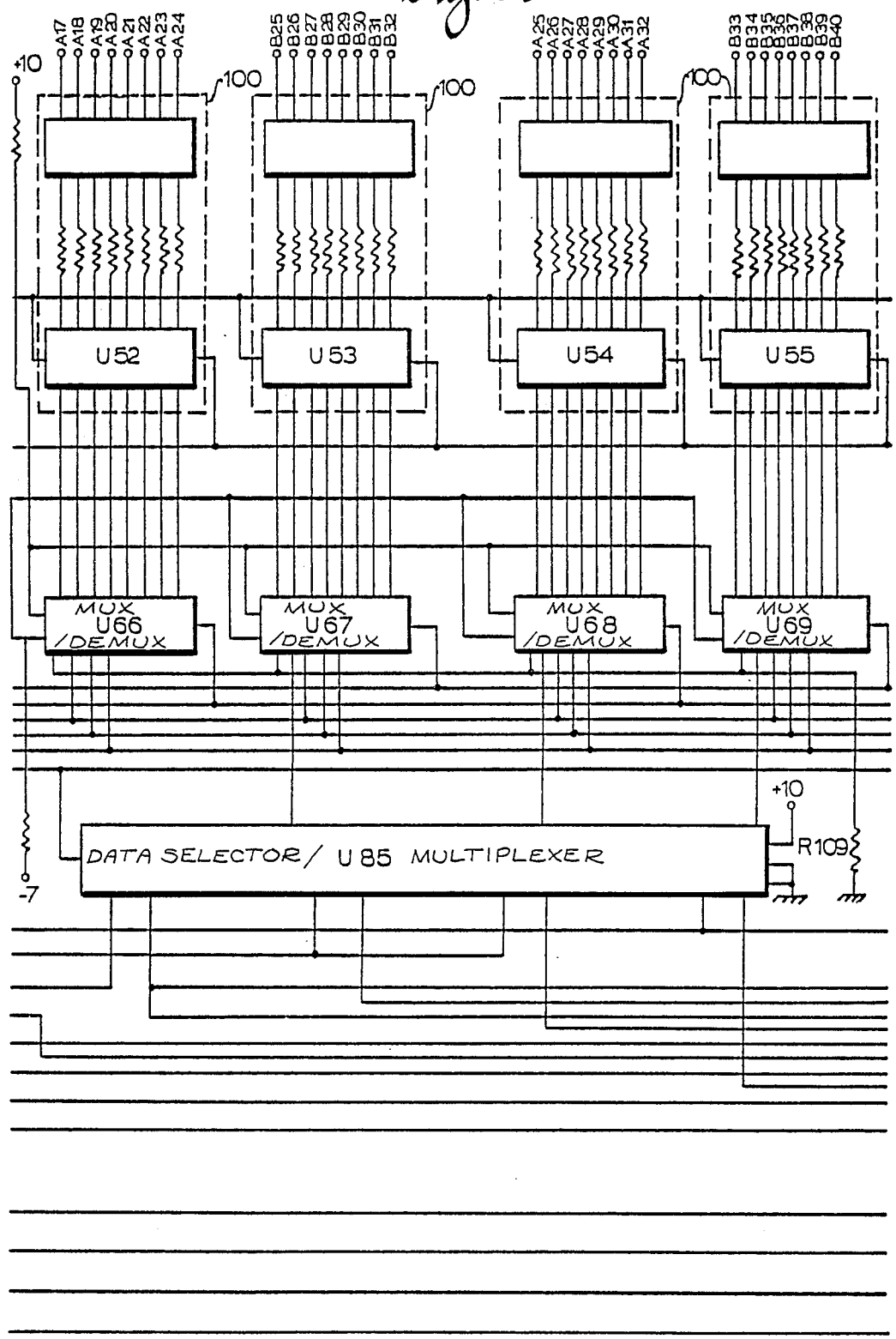
Figure 6D:
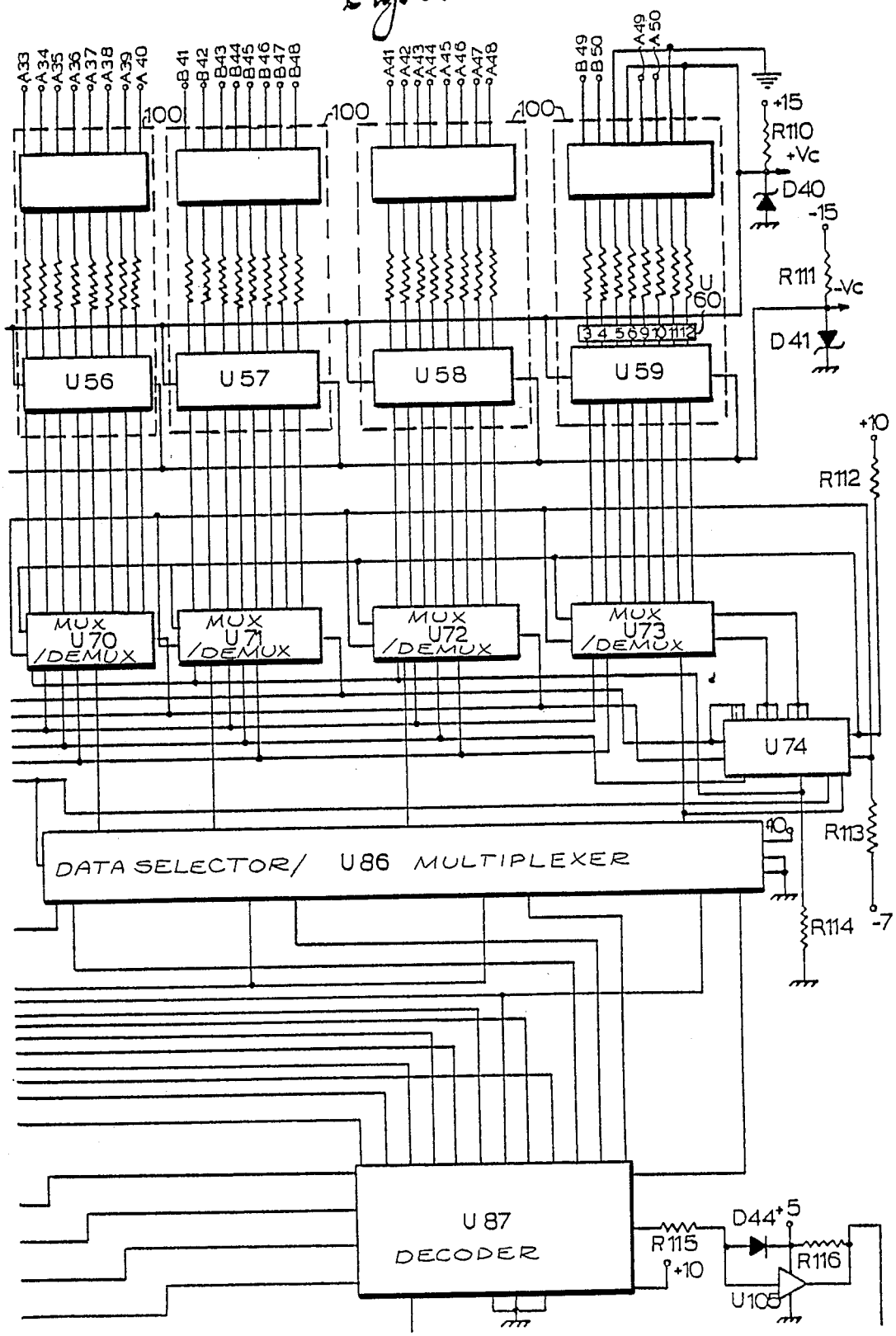
Figure 6F:
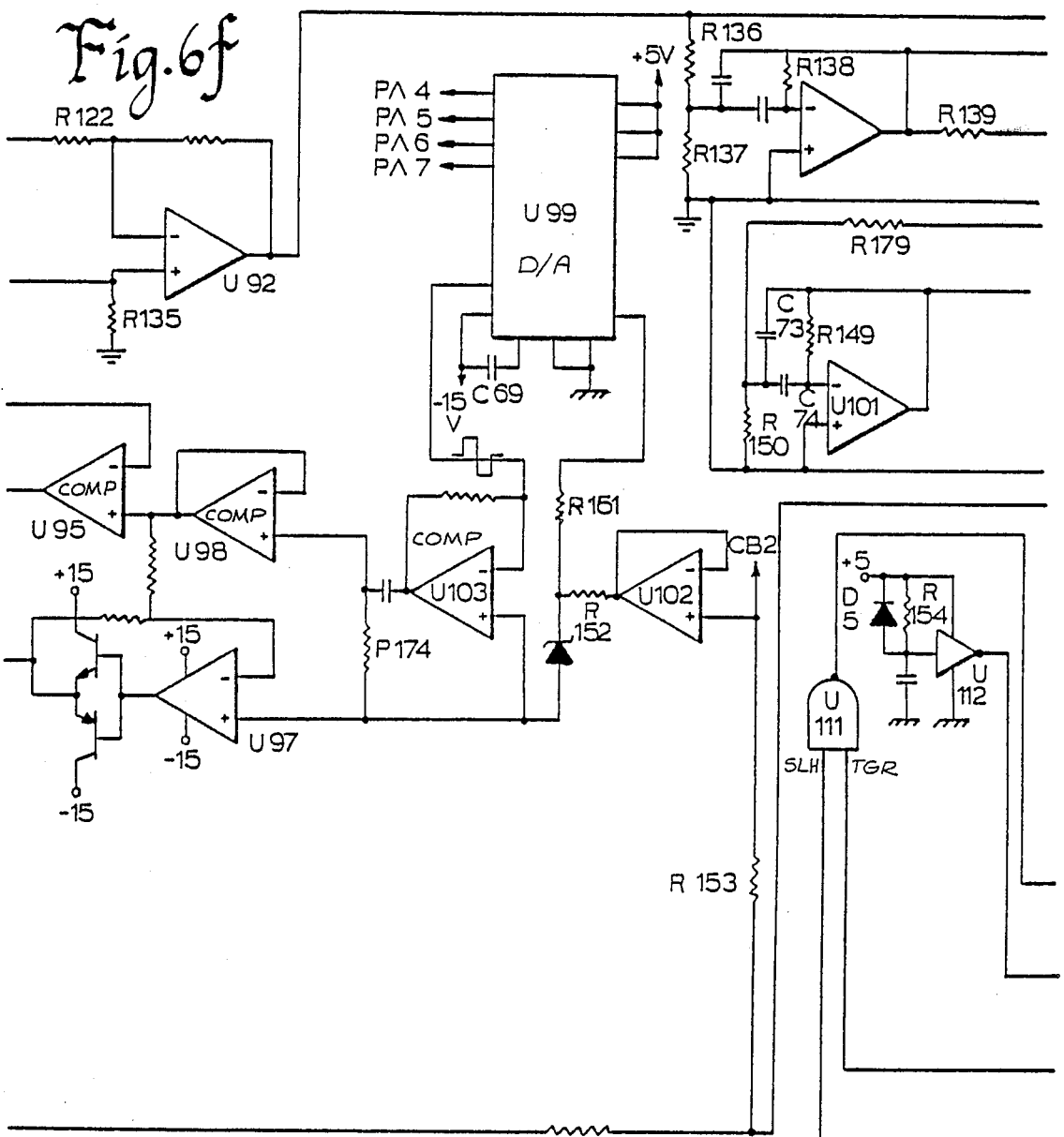
Figure 6G:
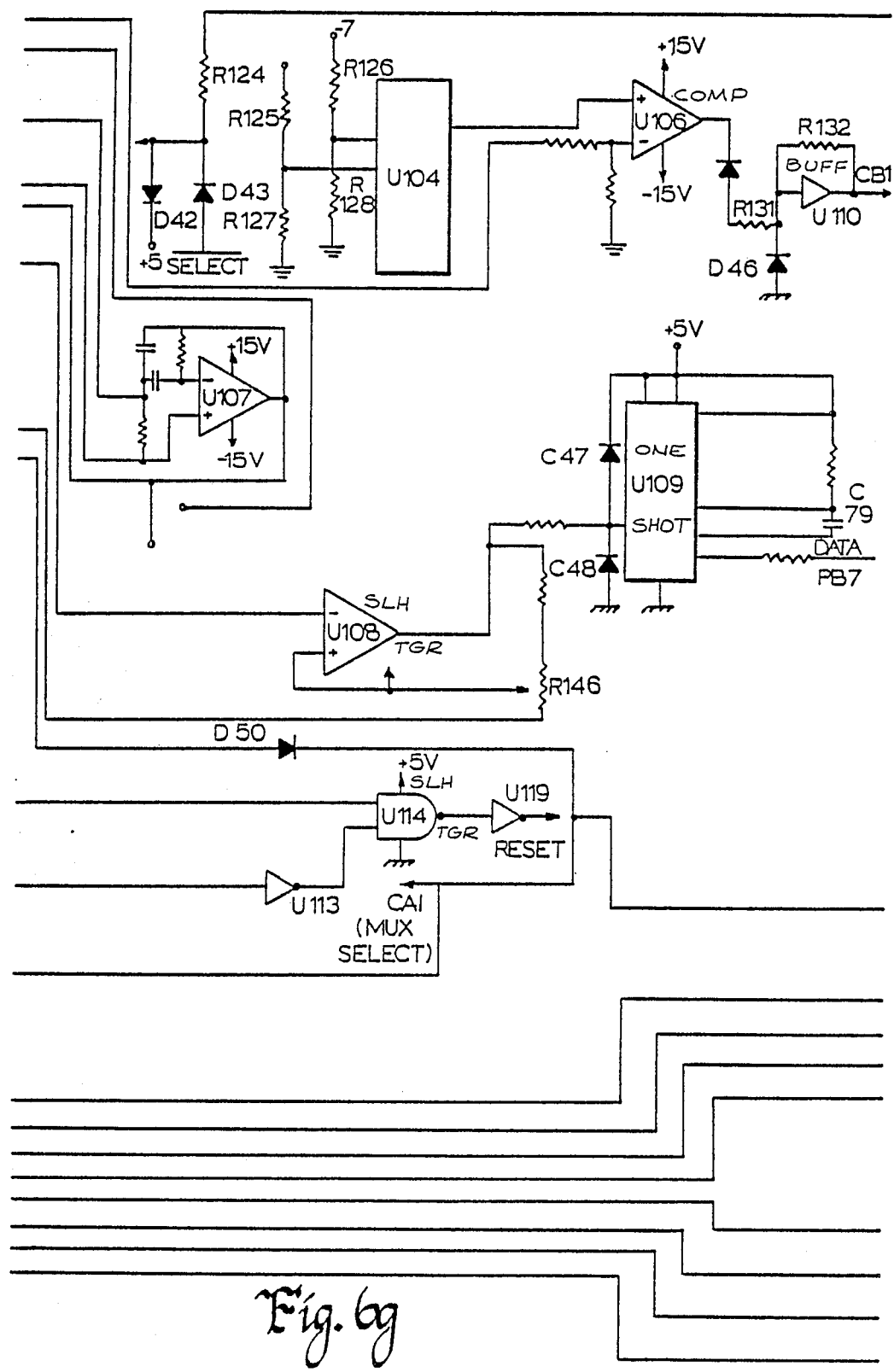
Figure 6H:
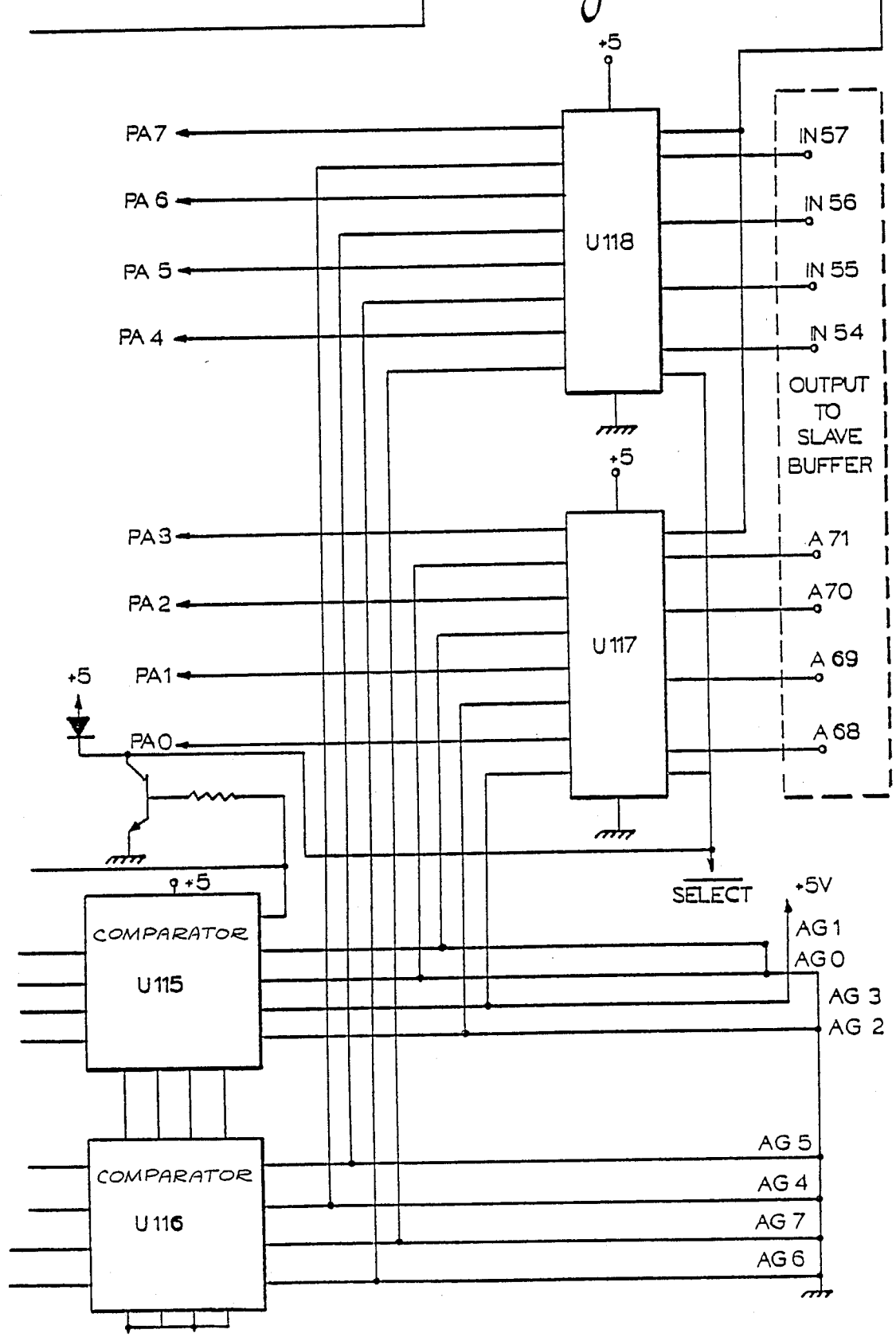
Figure 7A:
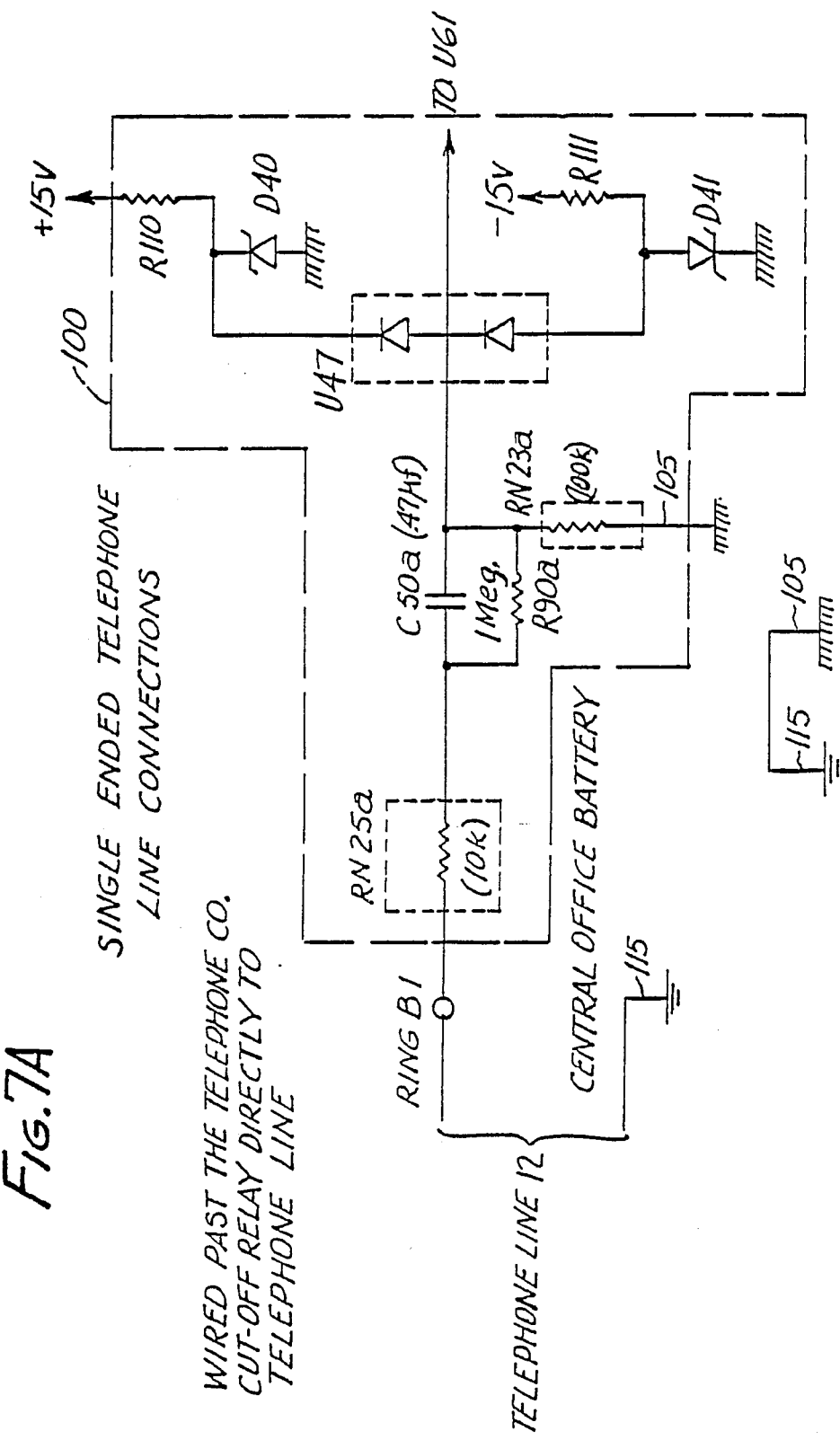
Figure 7B:
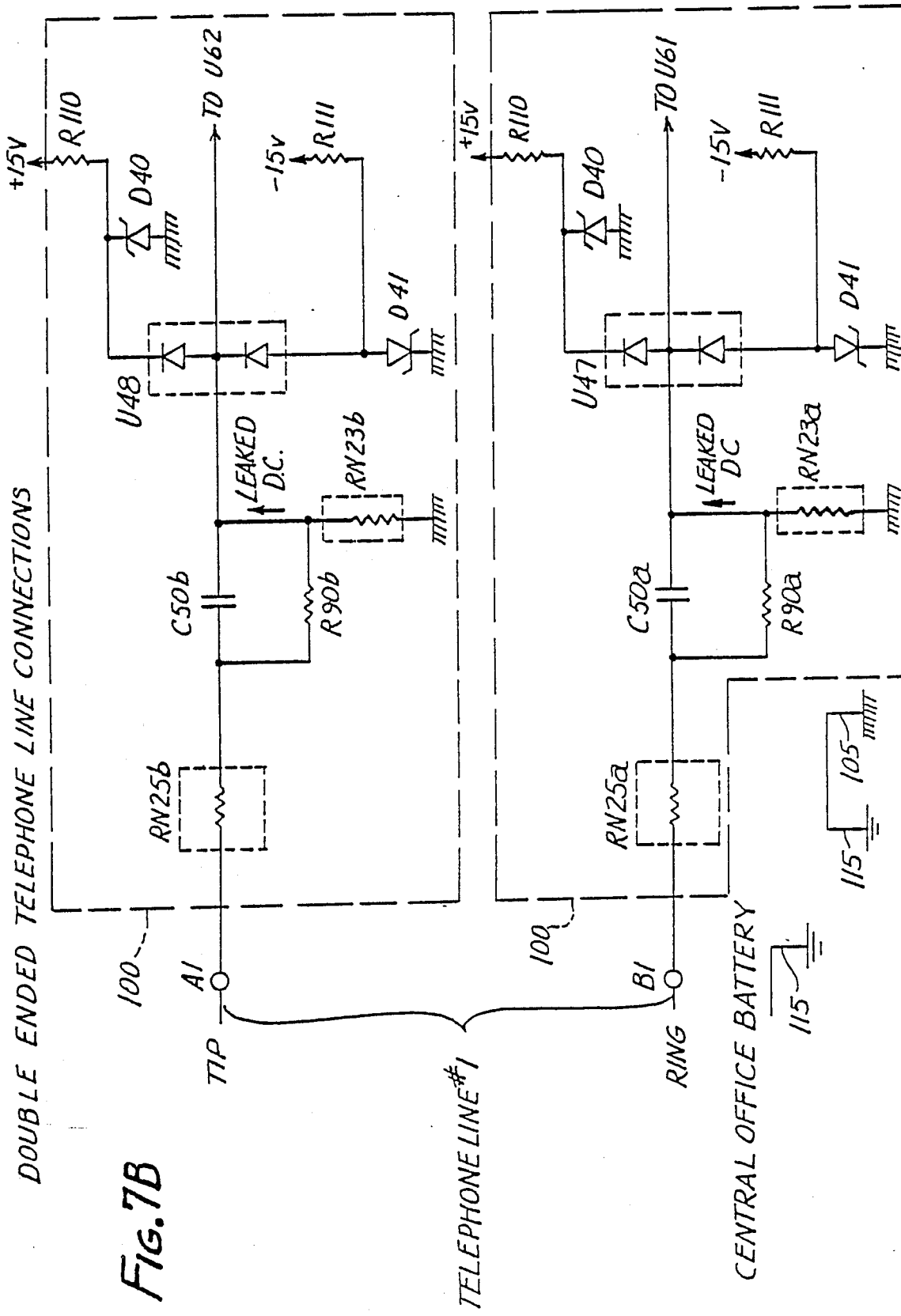
Figure 8:
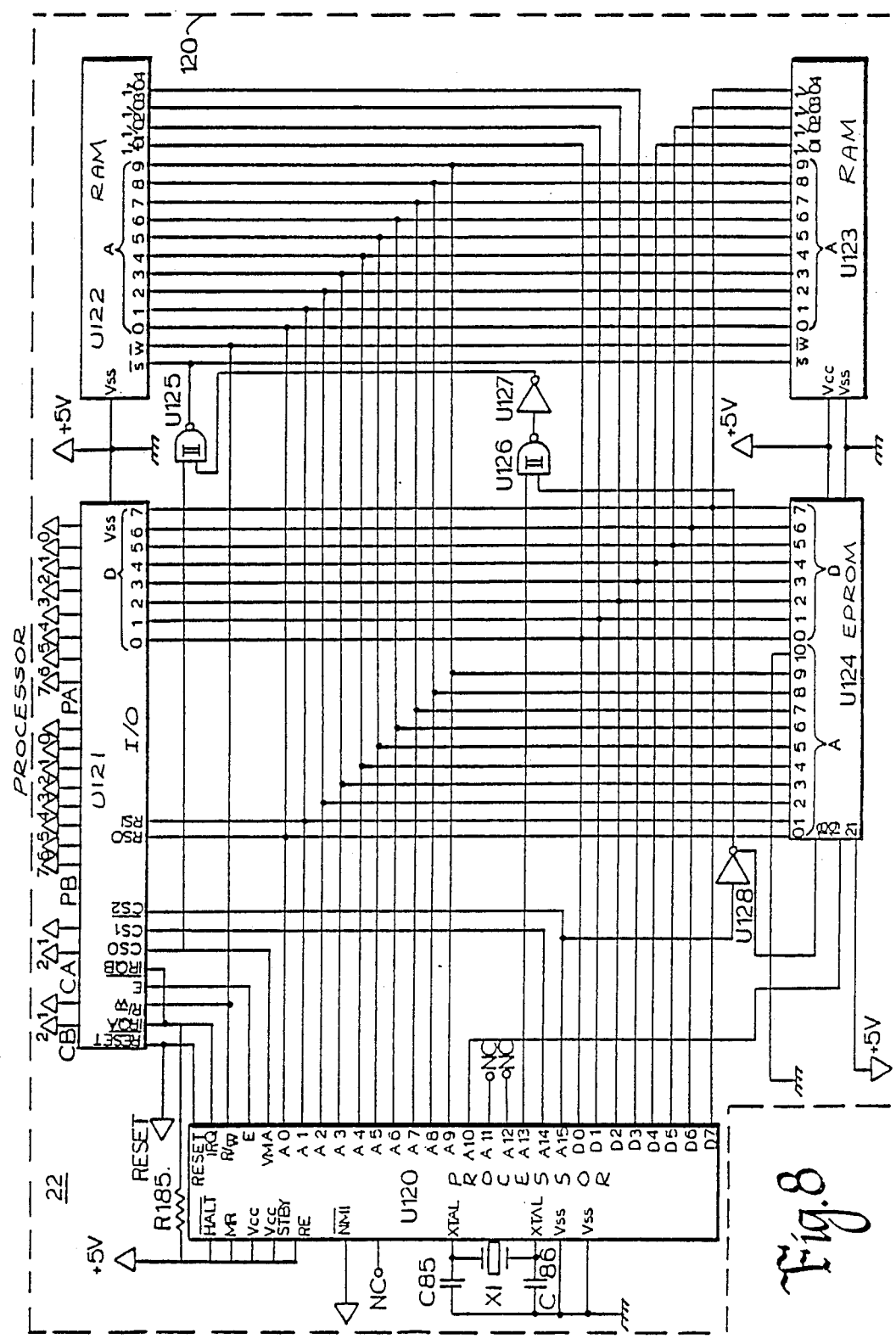
FIGS. 8A, 8B and 8C are electrical schematic diagrams of the line select, card select and data circuits of the digital interface card of this invention.
Figure 10B:
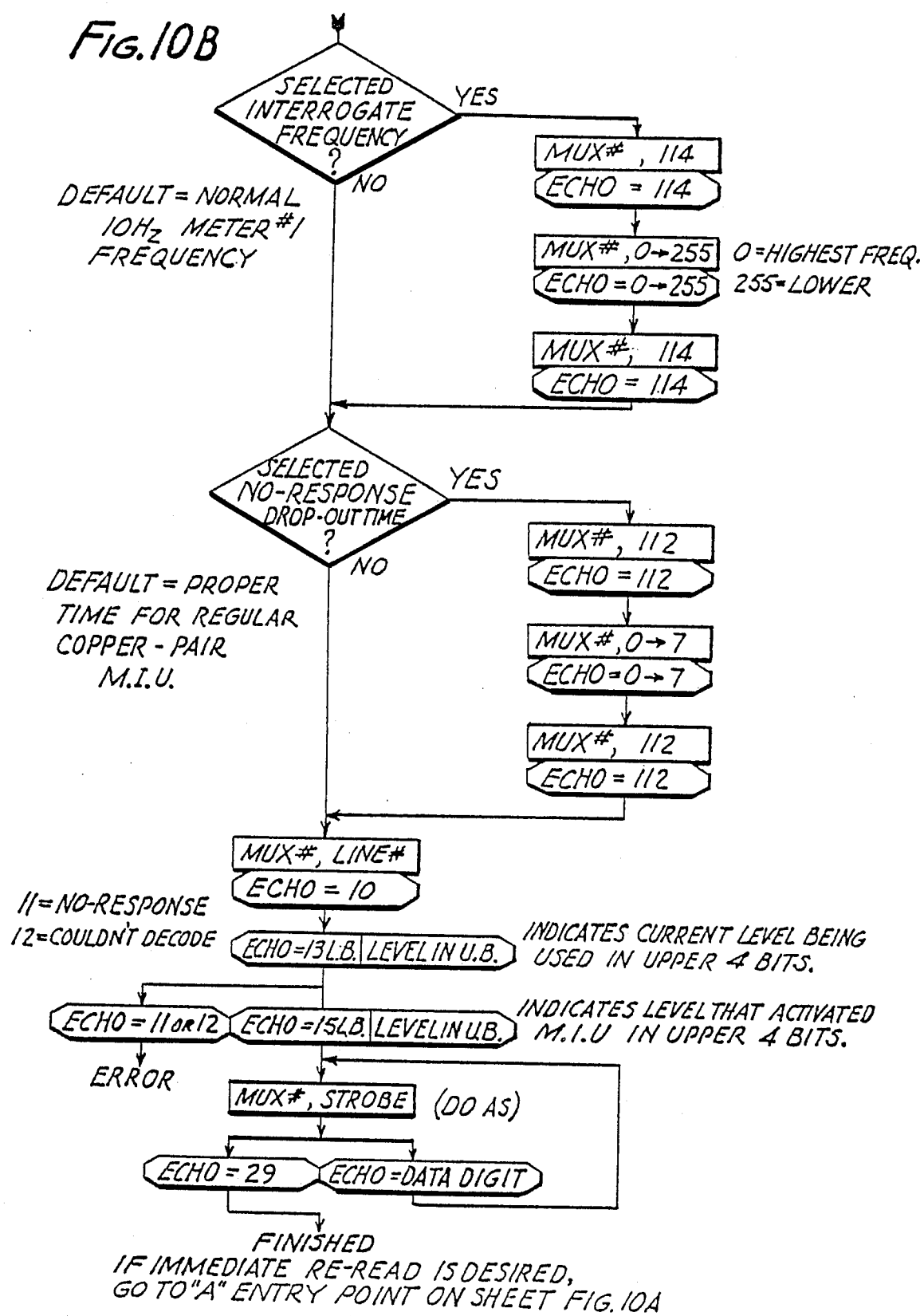
FIG. 10 is a layout diagram for FIGS. 6 and 7.
Figure 11:
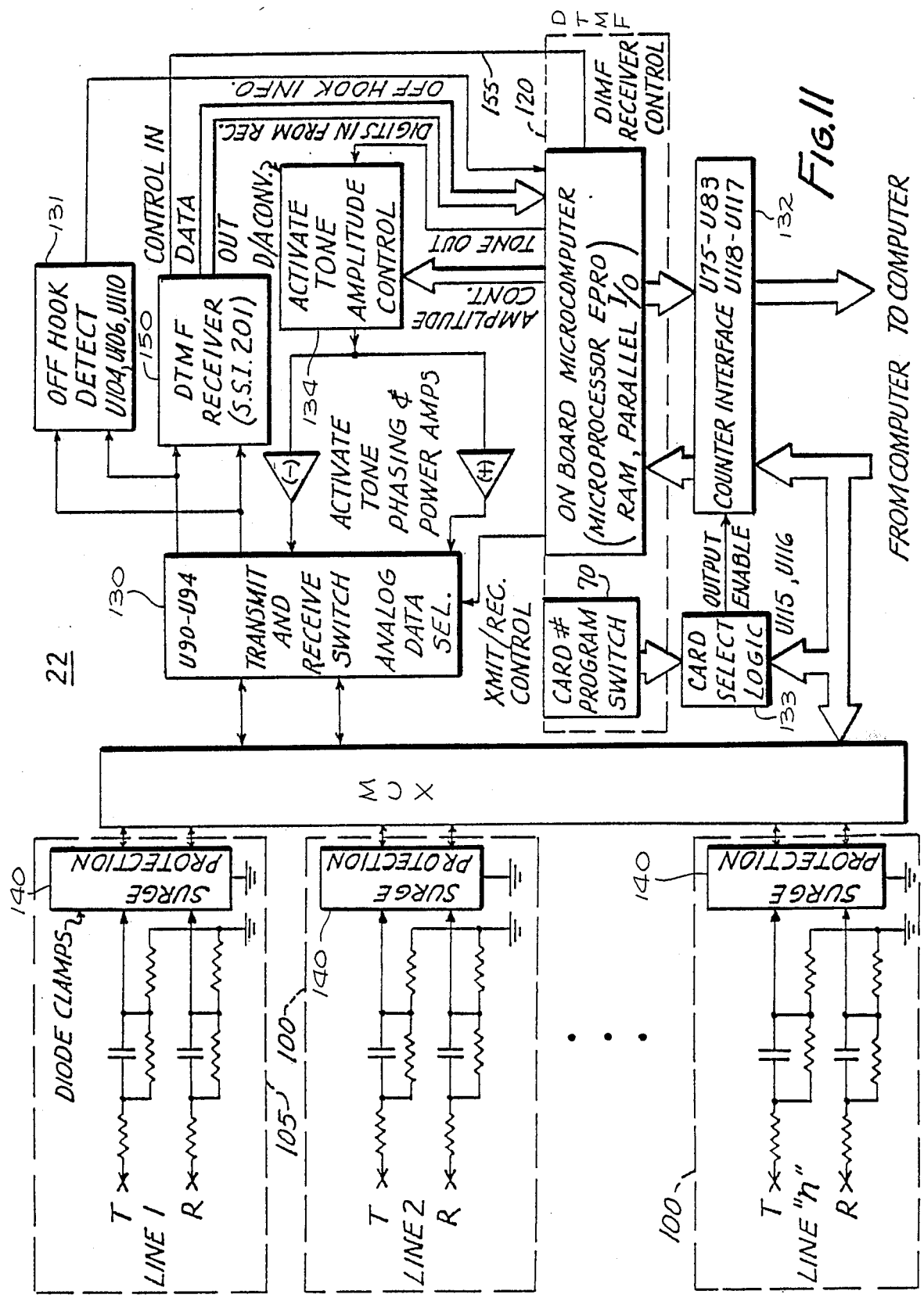
FIG. 11 is a layout diagram for FIG. 8.
Figure 1:
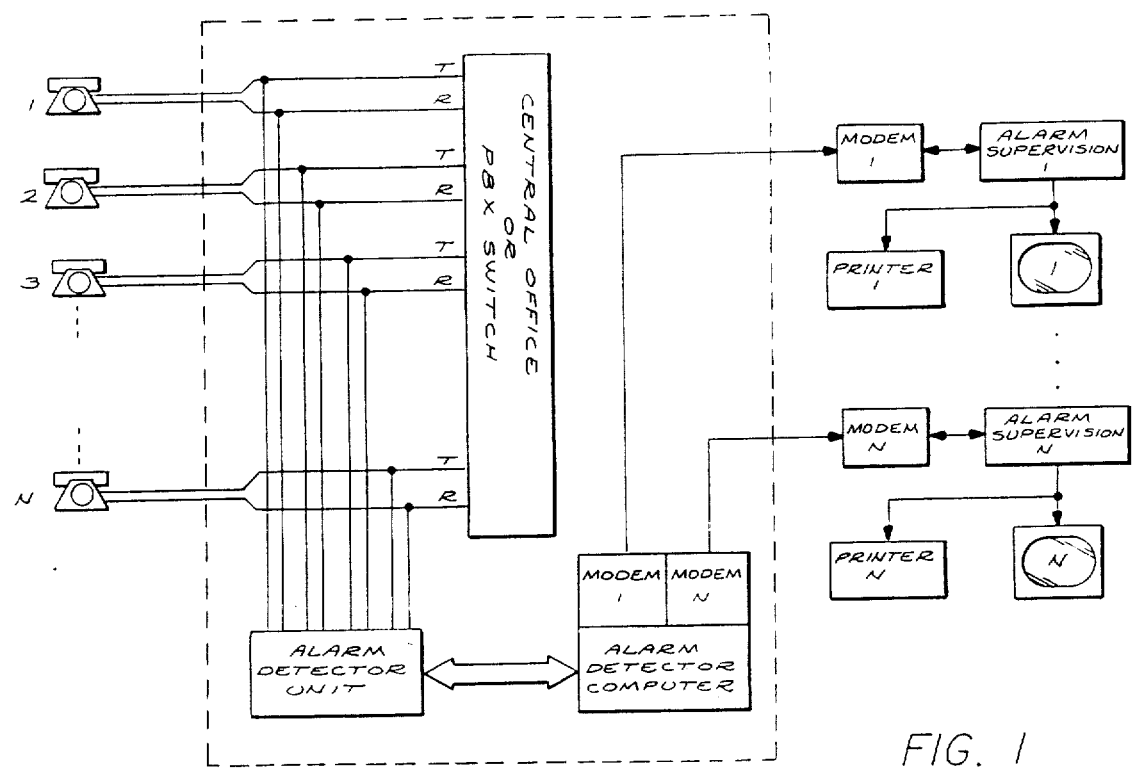
Figure 2:
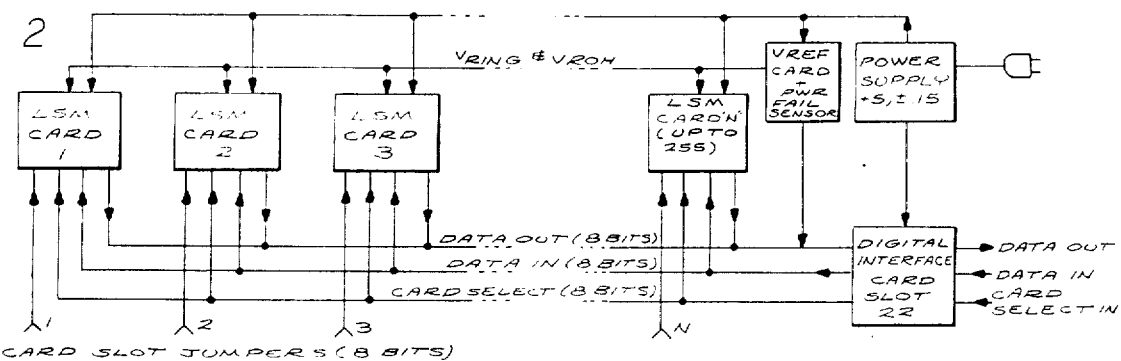
Figure 3:
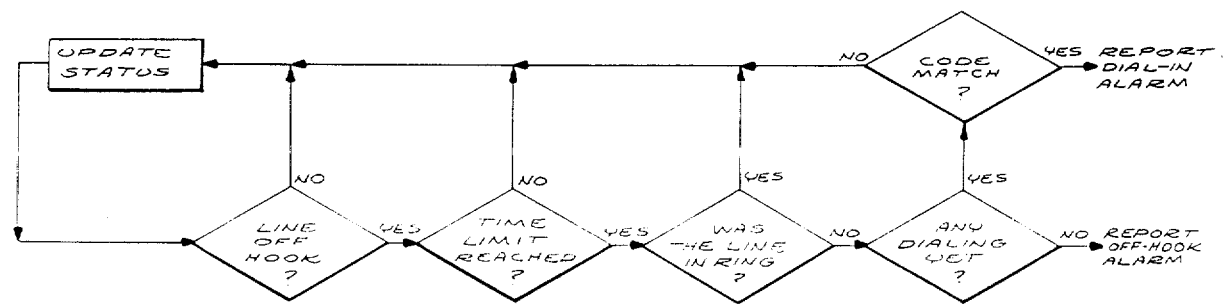
Figure 4:
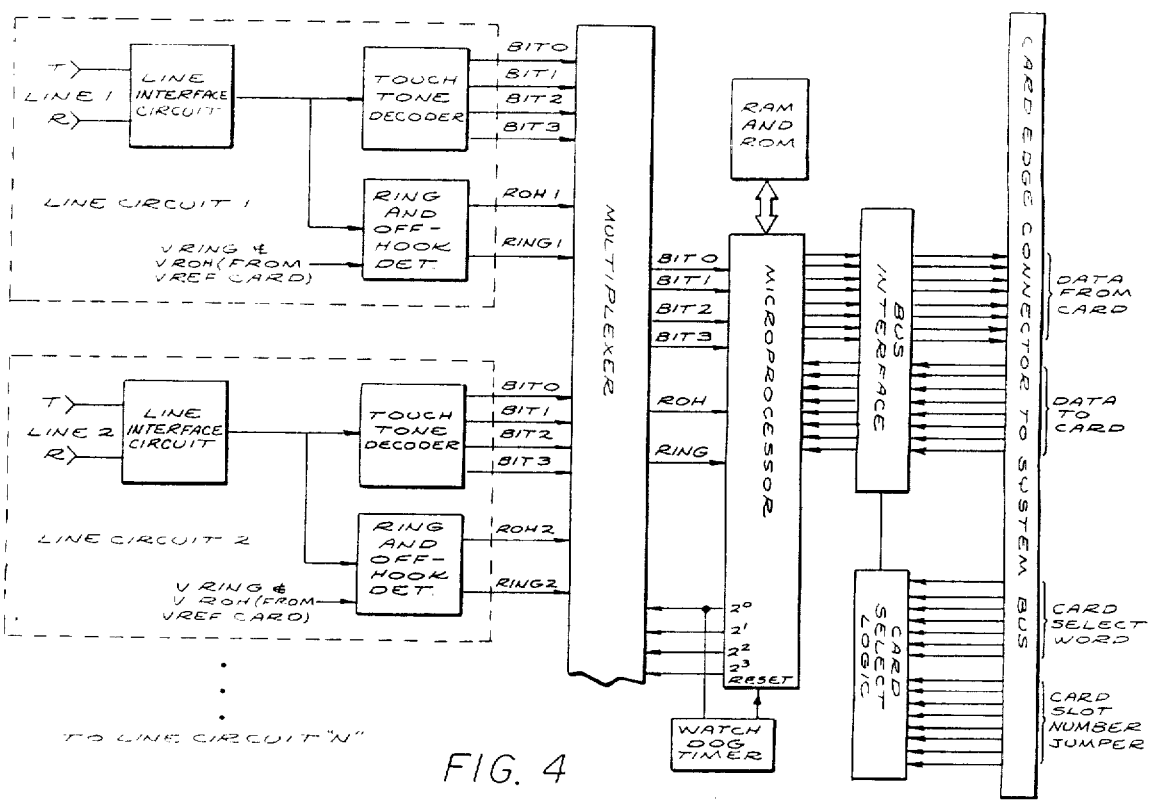

For a more complete understanding of this invention, reference is now made to FIG. 1 showing the system 10 of this invention in its broadest sense in connection with FIGS. 2–4 illustrating an application of this invention in an alarm system configuration. The system so configured includes an alarm detector unit (ADU) 12 and an alarm detector computer (ADC) 14 as well as a plurality of alarm supervision units (ASU) 16(1) through 16(N).

This system 10 is coupled to a conventional telephone system or PBX (private branch exchange) 18 having a plurality of individual subscriber sets 20(1) through 20(N) connected to the telephone switch 18 by respective pairs of line conductors 22(1) through 22(N) connected to the telephone switch 18 by respective pair of line conductors 22(1) through 22(N). The alarm detector unit 12 includes a plurality of input conductor pairs 24(1) through 24(N), one pair for each subscriber station 20 served by the system. These input conductors bridge the subscriber line conductors 22 which are designated Tip(T) and Ring (R) in conventional telephone practice.

LINE STATUS MONITOR OR ALARM DETECTOR UNIT

The alarm detector unit (ADU) 12 of FIG. 1 is that portion of the system 10 that actually monitors all the telephone lines on the system and determines whether an alarm condition has occurred. Each line 22 to be monitored is hardwired to the ADU 12 with the connection point being to both tip and ring anywhere along the path from the switch 18 to the telephone instrument 20(1–N).

The ADU 12 constantly scans all lines in the system keeping track of each line's status at a rate sufficiently fast to guarantee that any change of status does not go unnoticed.

Typically every line 20 should be checked at least once every five or six milliseconds to guarantee detection of the shortest duration event.

Each line is monitored for the following four possible normal status conditions:

1. Receiver on-hook (idle condition);
2. Receiver off-hook;
3. Line in ring condition;
4. Dialing in progress.

The ADU 12 maintains a unique "line status" table for each line 20 and uses this continually updated information to determine when an alarm condition occurs.

The alarm detector unit 12, as best seen in FIG. 2, includes a plurality of line status monitor cards 26(1) through 26(N), one for each sixteen lines monitored. The line status monitor cards are shown in FIG. 4 as including a line interface circuit 28 which provides high impedance isolation and protection from the telephone line while allowing detection and discrimination between each of the four normal conditions of 1–4 above. These conditions are detected by a conventional touch tone decoder 30 for detecting dialing and a ring and off-hook detector 32 responsible for ascertaining which of the other three conditions exist. The output of each of the touch tone detectors 30 and two lines 36 and 38 introduce off-hook signal on line 36 and ringing in progress signal on line 38 into a multiplexer 40. There is a set of input leads 34, 36 and 38 for each subscriber line 20(1) through 20(N). The multiplexer inputs are scanned at a rate of, for example, 200 microseconds and introduced into a microprocessor 42 with its associated random access memory (RAM) and read only memory (ROM), both represented by box 44 in FIG. 4.

The microprocessor 42 provides line circuit select signals to the multiplexer 40 via lines 46, which, in a typical installation, are 4 in number for a line status monitor card 26 serving sixteen subscriber lines 20. An automatic restart or "watch dog" timer 48 restarts the scanning of lines at the multiplexer 40, if for any reason, the integral timer of the microprocessor 42 fails to furnish a scan advance pulse to the multiplexer 40. A buss interface circuit 50, in effect a switch under the control of card select logic 52, provides a dual directional data transmission (parallel 8 bit) when enabled by card select logic 52 to pass data to and from a card edge connector 54 to the system buss 15 of FIG. 1. The presence of a microprocessor 42 in each line status monitor card allows ultimate flexibility for the system 10 so that what constitutes an alarm condition such as the dialed sequence or time OFF-HOOK may be tailored for each line, if desired. The local microprocessor 42 may also be programmed in accordance with this invention to provide a variety of other optional features described below in the section, Firmware and Software Designated Options.

Figure 5:
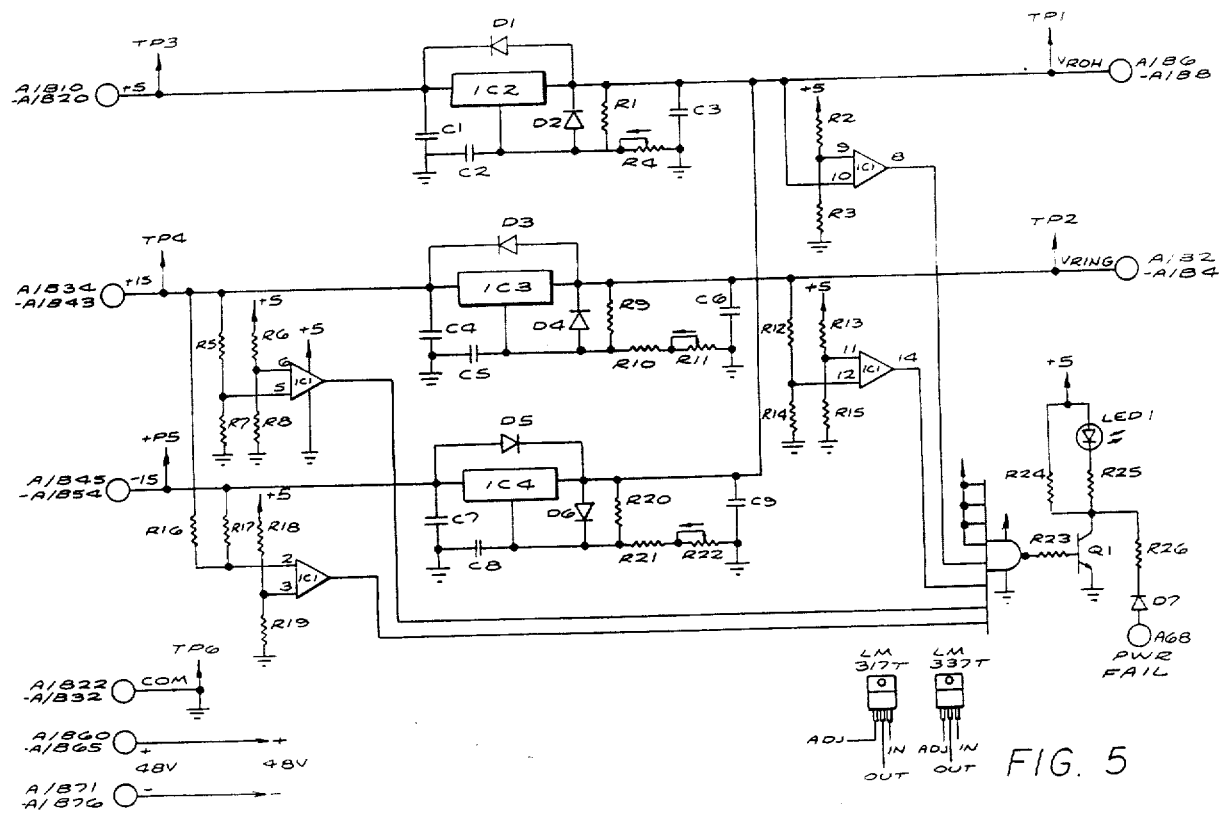

The line status monitor cards 26(1) through 26(N) of FIG. 4 are each connected as shown in FIG. 2 to a common power supply 48, shown in detail in FIG. 5, which also powers the digital interface card 60 and a voltage reference and power loss sensor card 62 of FIG. 2.

Returning again to FIG. 1, the alarm detector computer 14 is coupled either directly or indirectly through modems 64(1)–64(N) to a number of Alarm Supervisory Units 16(1–N) which are represented in FIG. 1 as including a corresponding modem 68 R, an alarm supervision unit 70 and typically a monitor 72 and a printer 74. The monitor 72 will display the alarm condition, the alarm station, its location and optionally a map showing the access routes to the alarm sending substation. The printer 74 provides a printed record of the same data.

Each supervisory station 16 may be responsible for a selected group of lines or may display alarm conditions from the entire system depending upon the data directed to that supervisory station 16 via its respective modem 68 from the alarm detector computer 14. This selection capability is software or firmware controlled thereby illustrating further flexibility of the system of this invention.

The alarm system comprises three main subsystems, see FIG. 1. These are the Line Status Monitor or Alarm Detector Unit (ADU), the Alarm Detector Computer (ADC) and the Alarm Supervision Unit (ASU). In addition, standard computer modems, CRT displays and printers are required to complete the system.

ALARM DETECTION UNIT OPERATION

The detection by the ADU 12 of an alarm condition proceeds as illustrated in the flow diagram of FIG. 3. The alarm detection unit constantly updates its line status every 5 or 6 milliseconds. When the Off-hook condition is detected by a drop in line voltage, a counter is enabled in the line status table. This counter is incremented by one each scan cycle the line remains continuously off-hook. When this counter reaches a count which represents an off-hook time interval corresponding to the off-hook alarm time-out selected, the status table will be examined to determine whether the line went off-hook as a result of being rung or, if not, whether any dialing has occurred indicating normal telephone usage. If neither of these two conditions is reflected in the status table at the moment of time-out, the off-hook alarm will be reported. In addition, whenever dialing is performed the incoming digits (usually DTMF "touchtones") are captured and compared to the preset alarm code. If a match occurs, the dial-in alarm will be reported.

Physically, the alarm detection unit (ADU) is a buss oriented card cage subsystem. Each card cage contains twenty alarm detector cards as illustrated in FIG. 4, a voltage reference card and a digital interface card as illustrated in FIG. 2. The alarm detector computer (ADC) 14 which connects by cable 15 to the digital interface card 60, can selectively communicate with any of the alarm detector cards in the system by issuing an 8 bit parallel digital "card select signal" which causes a digital communications link to be opened between the ADC 14 and the selected cards.

Each alarm detector card of FIG. 4 contains a microprocessor 42 with RAM and a computer program contained in non-volatile EPROM in box 44. This program controls all aspects of the monitoring, timing, decision making, and reporting functions that relate to each line 20 connected to that particular card.

The cards can operate independently allowing extremely fast scan rates since the overall time to scan all lines in an entire system is determined by the scan rate of one card. Typically, one card will handle sixteen to twenty four lines with a per line monitoring time of less than 200 microseconds. This corresponds to an overall cycle time of between 3.2 and 4.8 milliseconds which is sufficiently fast to detect an incoming ring signal during its first positive going half cycle.

The 200 micro-second monitoring time per line is achieved by utilizing dedicated status detecting circuit elements for each line 20 connected. The outputs of these detecting elements are multiplexed at digital speed into the micro-processor 42's digital input-output (I/O) port.

This is important since these status detecting circuit elements need time to correct identify the current line status. As an example, the DTMF receiver circuitry 30 needs a minimum of 40 milliseconds of continuous input to identify a valid digit entry.

Each telephone line 20 connects to one of the inputs on an alarm detection card through an edge-connector in the card cage. A differential amplifier stage with a DC gain of one-tenth and AC gain of close to 1 receives any line status signals and produces a single-ended output for use by the status detecting elements. The input impedance of this stage exceeds 10 megohms at DC as specified by FCC regulations. In addition, a worst case input impedance, in case of malfunction, of nearly 1 megohm is an inherent benefit of the input stage design utilized. The output of this stage will assume the following voltage levels for the various line conditions anticipated.

| Line Status | Line Signal | Stage Output |
| --- | --- | --- |
| On-hook | 45–55 Vdc | 4.5 to 5.5 Vdc |
| Off-hook | 0–35 Vdc | less than +3.5 Vdc |
| Ring-in | Typical 90 Vrms 20–30 Hz | greater than +8.0 Vdc at ring frequency rate |
| Dial-in | Audio frequency | replication of tone at full amplitude riding on a DC bias level as determined by instantaneous DC condition (On-hook or Off-hook) of the line. |

Figure 6:
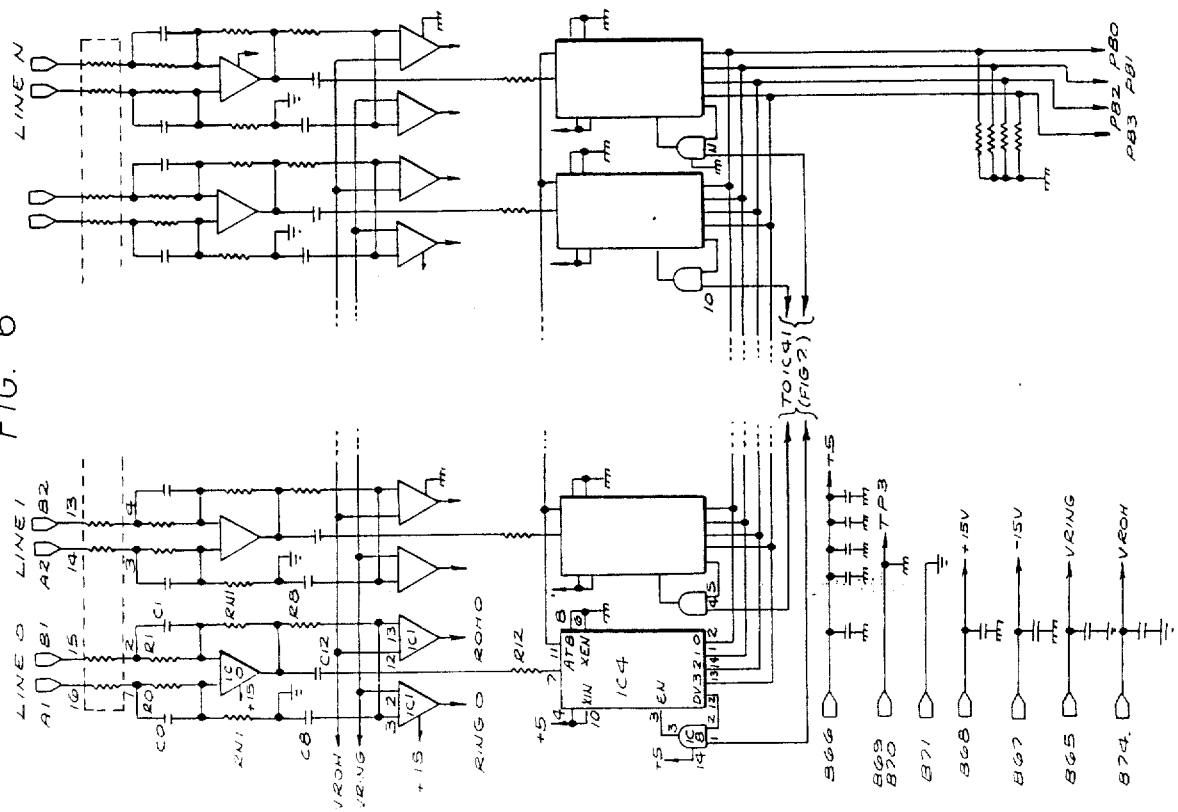

In the line interface circuit 28 of FIG. 6, the DC component of the output is blocked by a series resistor-capacitor network and the AC component is routed to a conventional DTMF decoder 64 (IC4). The DC component is smoothed out by a single pole resistor/capacitor low pass filter and the result routed to a pair of voltage comparators 65 and 67. Comparator 67 produces a high level output if the DC level falls below about 3.5 VDC indicating a possible OFF-HOOK condition. The comparator 65 goes high if the DC level ever rises above about 8.0 volts indicating a possible RING-IN condition.

The DTMF decoder 64 possesses four tri-state digital outputs which represent a non-zero total whenever a valid digit has been recognized. With the additional two outputs the off-hook and ring comparators provide a total of six digital bits representing the instantaneous status of each line connected to a card. The microprocessor 42 of FIG. 4 controls which line's six status bits it wants to examine by issuing a line select code which causes the multiplexing of the desired line's status onto a common six bit bit buss 41 in FIG. 4. The microprocessor 42 selects a line, obtains the current instantaneous status and updates that line's line status table in it RAM.

LINE STATUS TABLE

The line status table is eleven bytes in length and its locations are defined as follows:

| | |
| --- | --- |
| Location 0 | Overall line status |
| | Hex 00 if line is in normal use |
| | Hex 1A if line has never been on-hook since a reset or power-up. (This prevents lines off-hook during initial power-up from causing alarms.) |
| | Hex 2C if the microprocessor has identified a card malfunction. |
| | Hex 9 in upper nibble if off-hook alarm has |

-continued

| | |
|---|---|
| | occurred. Hex C in upper nibble and Line # in lower nibble if Dial-in alarm has occurred |
| Location 1 & 2 | 16 bit Off-hook Counter used to time off-hook periods |
| Location 3 | Off-hook Flag, is set to "1" after the off-hook counter indicates an off-hook condition has been in progress for approximately .25 seconds. |
| Location 4 | An 8 bit Ring-in Counter - times ring comparator high-output periods for the purpose of eliminating accidental ring status recording caused by momentary noise spikes. |
| Location 5 | Ring Flag - is set to "!" after the Ring-in counter has timed-out a valid ring-in condition. |
| Location 6 & 7 | A 16 bit on-hook counter used to time-out a line's return to the idle, on-hook condition. Two different time-out constants are used with this counter. One which is about 0.5 seconds is used when a transition from off-hook to on-hook is detected. The second, which is about 4 ½ seconds is used to return to on-hook status when only a ring has been detected. This is necessary to record a ring since the ring signal is comprised of alternating, two second periods of ring generator on followed by four second periods of ring-generator off. The ring generator off periods are electrically indistinguishable from the normal on-hook idle line condition so the microprocessor must "remember" for a little over the four second off period that this line could be in Ring-in. |
| Location 8 | 8 bit digit dialed counter - incremented by one each time a valid digit has been dialed following a valid pause. It starts at zero with each new off-hook condition. |
| Location 9 | 8 bit code match counter - incremented by one for each consecutive digit entered which matches the digit dial-in alarm code. |
| Location 10 | Pause Flag - is set to one whenever a valid interdigit pause is detected during dialing. |

ALARM REPORTING

Whenever the microprocessor 42 of FIG. 4 determines that an alarm condition has occurred, it updates the line status table and latches a non-zero code in its ADC communications register. The ADC is constantly scanning each card's communication register looking for this non-zero condition. When it encounters one, the ADC can command the card to momentarily cease its scanning rounds and review all line status tables for alarm conditions.

This communication occurs at digital speed so the cards normal scan cycle time is negligibly affected. The microprocessor will clear the alarm status from the line status table and the communication register only when the proper handshaking sequence with the ADC indicates the alarm condition has been properly conveyed. This two level scan hierarchy coupled with the unique combination of constantly on-line detecting elements implements an alarm system capable of reliably detecting true alarm conditions on every line connected to it even if they all occurred simultaneously.

ALARM DETECTOR COMPUTER (ADC)

The alarm detector computer (ADC) 14 is a microprocessor based computer which scans the alarm detector unit (ADN) 12 for any alarm conditions. If any alarm conditions are encountered it will gather the alarm code and line numbers and, using the card and line number together to form a unique line ID number, look up in a table the actual telephone number or extension number as well as any geographical data pertinent and communicate the information to the correct zone Supervision unit (ASU) through standard telephone modems.

Large institutions sometimes have several zone supervision centers; each contains security personnel who are assigned to cover a given geographical area comprising specific telephone numbers. The ADC 14 can be programmed to only burden the personnel with the alarms that occur within their specific zone.

The actual display of the alarm information is provided by the CRT terminal 72 with a keyboard 73 and hardcopy printer 74. In addition, an alarm supervision unit 16 is provided in each zone supervision center. This unit provides an attention getting audio/visual display and keeps track of the operation of the ADC itself.

ALARM SUPERVISION UNIT

The alarm supervisor unit (ASU) 70 is an RS-232 compatible, microprocessor-based device designed to connect between the alarm detection computer (ADC) 14 and each zone supervision center's display peripherals. It contains a buzzer 75 and flashing light 7 which can be turned on by and ASCII code issued by the ADC as part of the alarm reporting routine.

The buzzer 75 and flashing light 71 can be turned off by a momentary contact push button switch 77 on the units enclosure or by a keyboard 73 entry resetting the alarm.

The alarm supervisory unit (ASU) 16 also acts as a system watch dog by continually monitoring the communication link from the alarm detector computer ADC 14. One of the alarm detector computer (ADC) 14's relentless tasks is to issue to each alarm supervisory unit (ASU) 16 printable or if desired, non-printablke ASCII code every few seconds. If the ASU ever fails to receive this code within a prescribed time interval, it will take over the communication link and sound a message to the display peripherals warning the personnel of a possible computer or communication link failure. Other malfunctions, such as individual alarm detector card failures or non-fatal computer malfunctions will be sent to the display peripherals by the alarm detector computer (ADC) 14 with the alarm detector computer (ADC) 14 controlling whether to turn on the light and buzzer feature of the alarm supervisory unit (ASU) 16.

Now referring to FIG. 5, in which the reference voltages are used in sensing receiver-Off-hook and station in ringing voltage levels. FIG. 5 shows a voltage regulator which operates from ±15 and 5 volts dc. to produce two adjustable reference voltages used by the line status monitor cards. These voltages are designated at the right of FIG. 5 as V ROH and V RING and are used by the comparators of the line status monitor cards of FIG. 6 to determine that the tip and ring voltage is high enough, for example, to call it a ring signal and low enough to call it a valid receiver-Off-hook condition.

The voltage reference circuitry of FIG. 5 employs operational amplifiers acting as voltage comparators 51 and 53 (IC1)s and three terminal voltage regulators 55, 57 and optional 59 (IC2, IC3 and IC4). Adjustable resistances R4, R11 and R22 allow the voltage regulators to be adjustable.

Also present in the circuit of FIG. 5 is an OR gate 54 coupled to the base of transistor Q1 to provide a low voltage indication on the PWR FAIL terminal and illuminate LED1 whenever the regulated voltage of any of the output voltages produced fall 20% below their standard level. The standard voltages V ROH and V RING are applied to the voltage comparators of the line circuits of FIG. 6.

Now refer to FIG. 6 for an understanding of the line circuits of this invention. As many as 16 such line circuits, represented as line 0 to line N are identically configured on one printed circuit card with line 0 of FIG. 6 shown with component values and reference numerals to illustrate the configuration of each of the individual line circuits.

Each line circuit as its input, terminals labeled A and B which correspond to the tip and ring conductors and each are so connected. A voltage divider comprises resistors 60, e.g. 1 megohm and 61, e.g. 10 megohms in series at the input to a very high impedance operational amplifier 63 (IC0), the output of which is reduced voltage input to a touch line code detector 64 (IC4) which provides binary coded decimal digit outputs on leads 66 whenever touch tone frequency pairs appear on the line 0.

Referring again to the input circuit at the top of FIG. 6, the capacitors C0 and C1 maintain the operational amplifier 63 at virtually unity gain for audio signals to avoid attenuating touch tone signals. The signals at the input to the operational amplifier 63 are also introduced via a low pass or roll off filter made up of resistor RN1 and capacitor C8 to a voltage comparator 65 (IC1) to produce an output when the line is in a ringing condition, e.g. with nominal 100 v. ring signals on the line L0. Comparator 67 senses a receiver OFF-HOOK condition to provide an OFF-HOOK signal whenever that condition exists. These three line circuits, the two IC1s 65 and 67 and IC4 65 detect the three possible normal operating line conditions. This I consider as the generic line status conditions from which the remainder of the system is able to provide a virtually unlimited number of options of information analysis.

Figure 7:
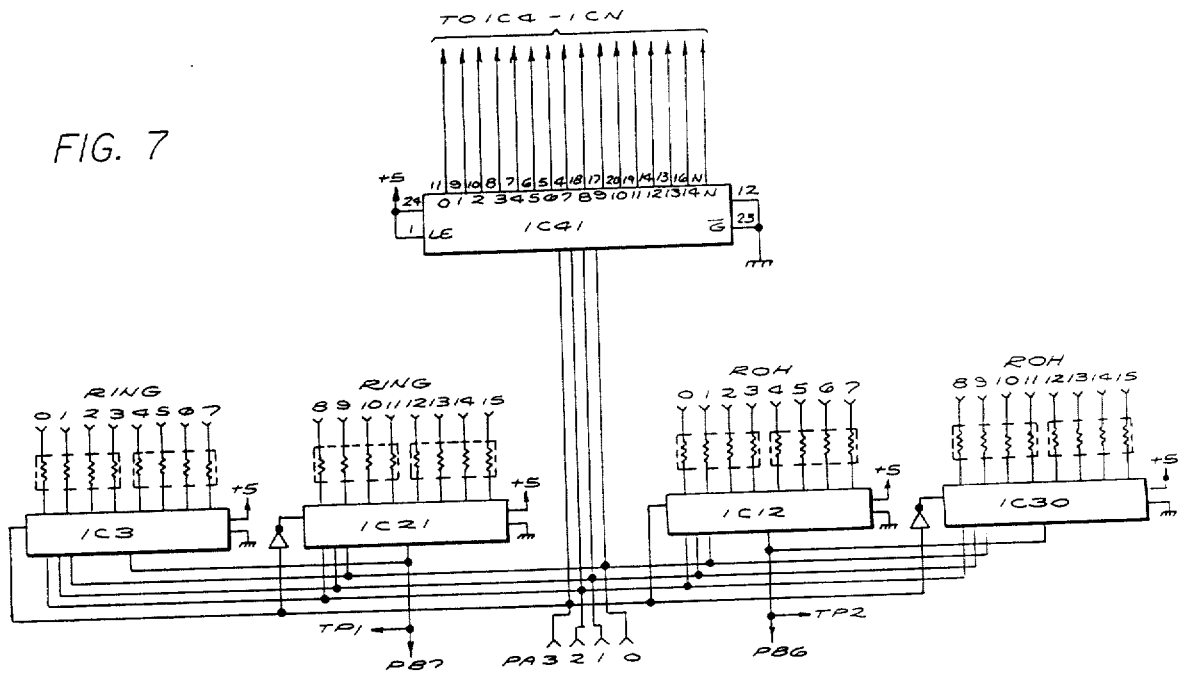

The binary coded decimal digit signals from each of the line circuits are introduced into the subsystem of FIG. 7.

The multiplexer section of the line status monitor card of FIG. 4 is illustrated in FIG. 7, which, with FIG. 6, shows the line status monitoring function. BCD coded line select signals arrive from the microprocessor 42 of FIG. 4 on leads 73 to 4 to 16 bit decoder 71 (IC41). These line select signals enable an individual line's touch tone decoder 64 of FIG. 6 over leads 72. Any touch tone pairs detected are BCD encoded and appear on leads 74 of FIG. 6.

The 8 to 1 data selectors 75 (IC3) and (IC21) under the same line select output from the microprocessor 42 on buss 73B selects the output of comparator G5 in order to detect the RING-IN status for the line selected. Line selection occurs simultaneously for receiver OFF-HOOK status via data selectors 76 (IC12) and (IC30) having their inputs connected to outputs of respective comparators 67 of FIG. 6.

Simply stated, each line circuit is examined for OFF-HOOK, RING or touch tone pairs and that information extended into the card microprocessor.

Figure 8A:
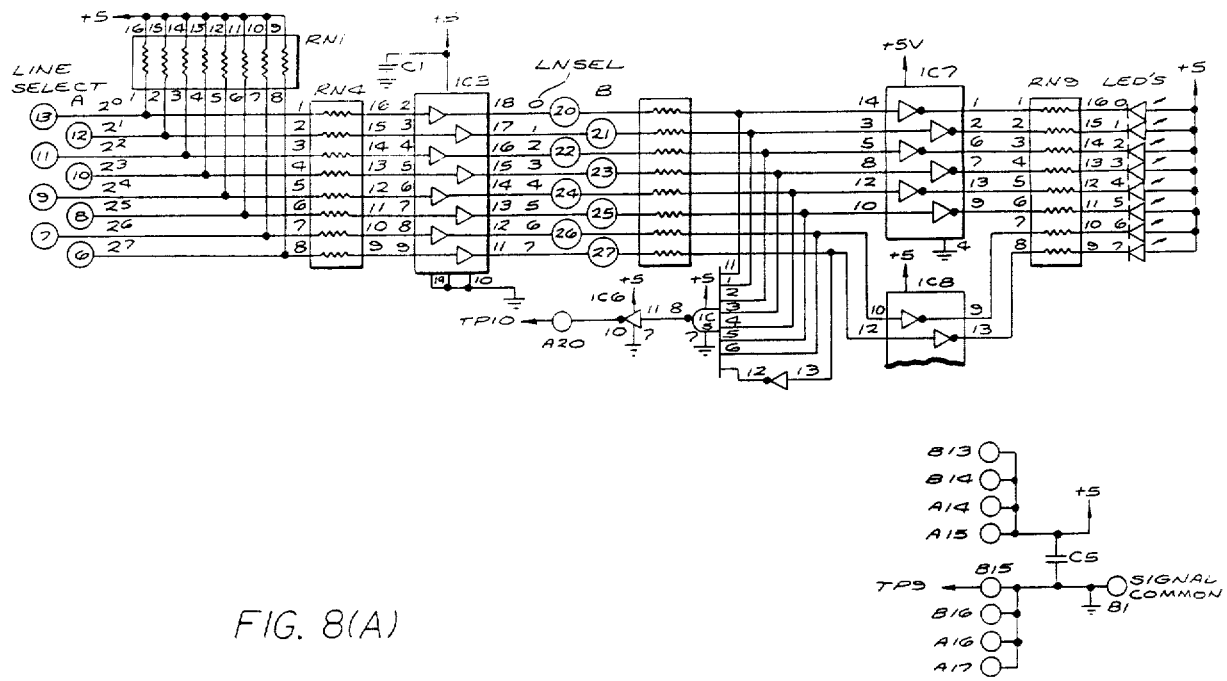

FIG. 8(A) represents the digital interface card 50 of FIG. 5. It employs 16 parallel input lines from the host computer which may be an IBM PC computer employing TTL logic. A resistance network 81 (RN1) constitutes pullup resistors to make the CMOS logic used in this system compatible with the host computer. Series resistors 83 (RN4) provide protection for the circuitry from transients which may appear on the wiring. Protected are octal CMOS buffer amplifiers 84 (IC4) in the line SELECT channel. The output of the buffers on its 8 parallel leads is introduced to the LSM cards and also through series resistors 85 to more buffer amplifiers 86 (IC7, IC8) which drive diagnostic LEDs 87 through resistors 88. The same coded information is available through gate 89 (IC5) which acts as a strobe signal source to drive optional equipment such as automatic meter readers.

Figures 8B, 8C:
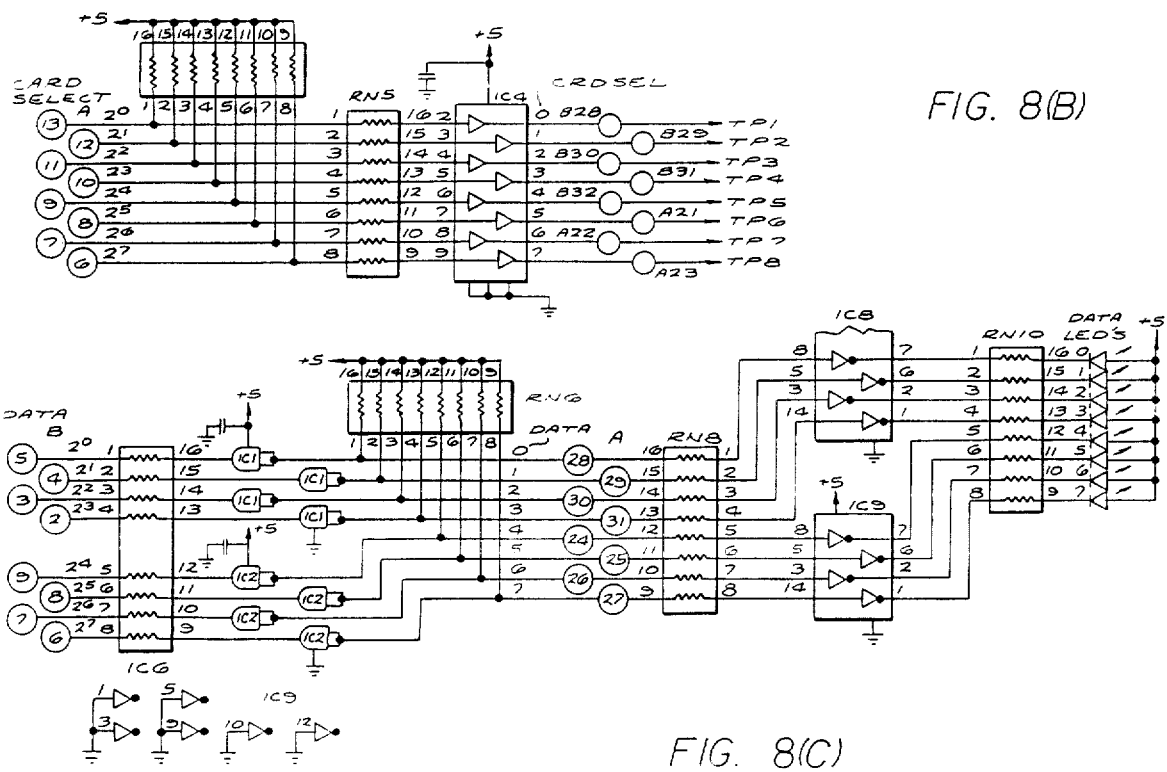

FIG. 8(B) is virtually the same as FIG. 8(A) and discloses CARD SELECT function but does not require the diagnostic LEDs used in the LINE SELECT information channel. This 8 bit channel is basically a buffer for the CARD SELECT signals from the host computer to the LSM cards.

FIG. 8(C) represents the data interface channel from the LSM cards back to the host computer. Signals arrive from the backplane board from each of the line status monitor boards of FIG. 9, below, on terminals 24–31 in the center of FIG. 8(C) and are used to indicate status on the DATA LEDs via buffer amplifiers IC8 and IC9 and series resistors RN10. The principal route of data from the LSM cards is via buffer gates (IC1) and (IC2) and series resistors RN to the host computer through the DATA terminals at the left in FIG. 8(C).

Figure 9:
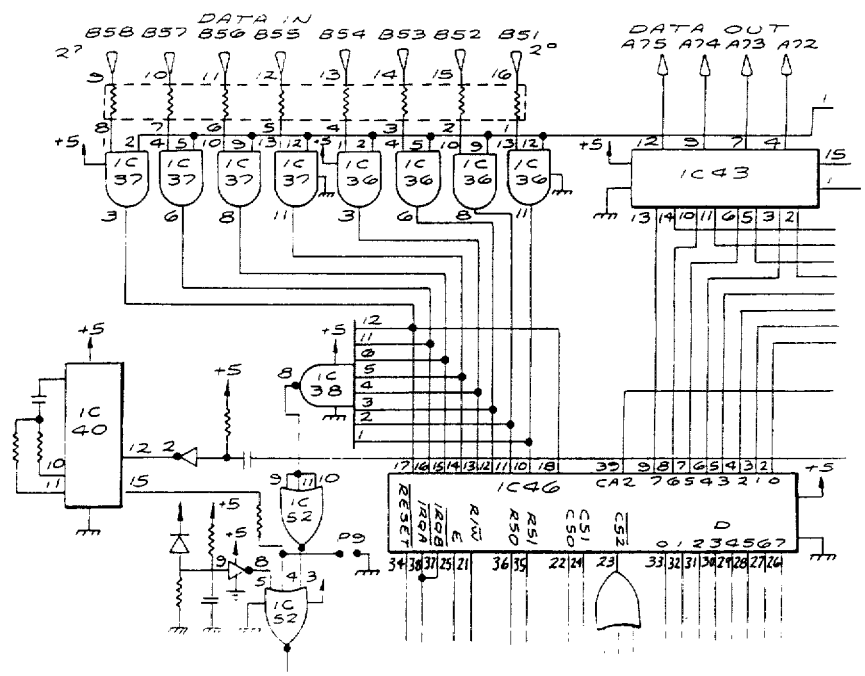
FIGS. 9(1), 9(2), 9(3), and 9(4) constitute an electrical schematic diagram of the CPU section of the line status monitor card of FIGS. 6 and 7.
Figure 9:
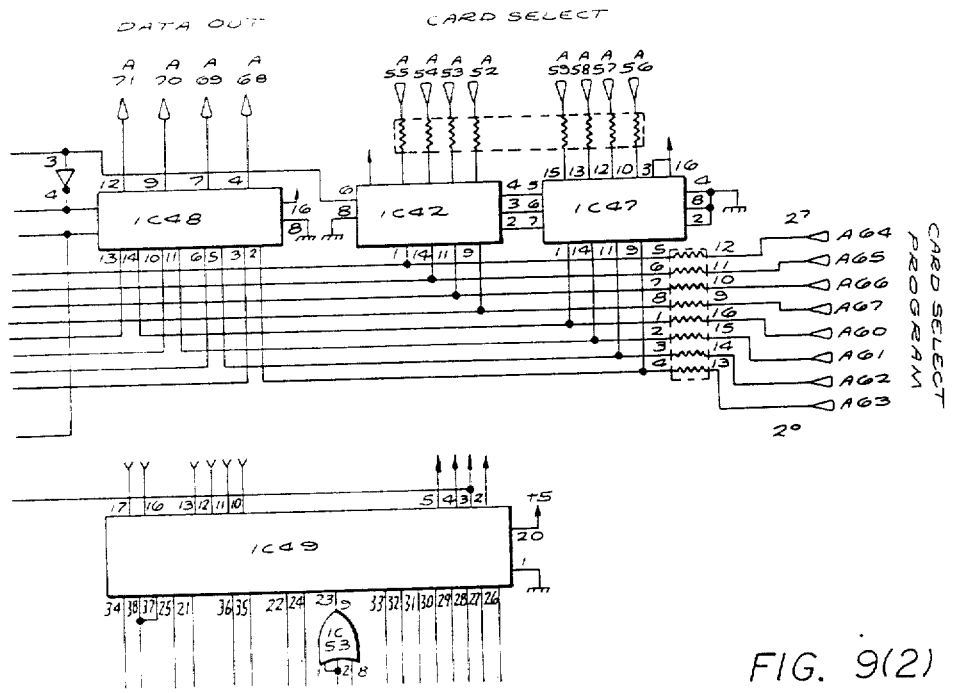
Figure 9:
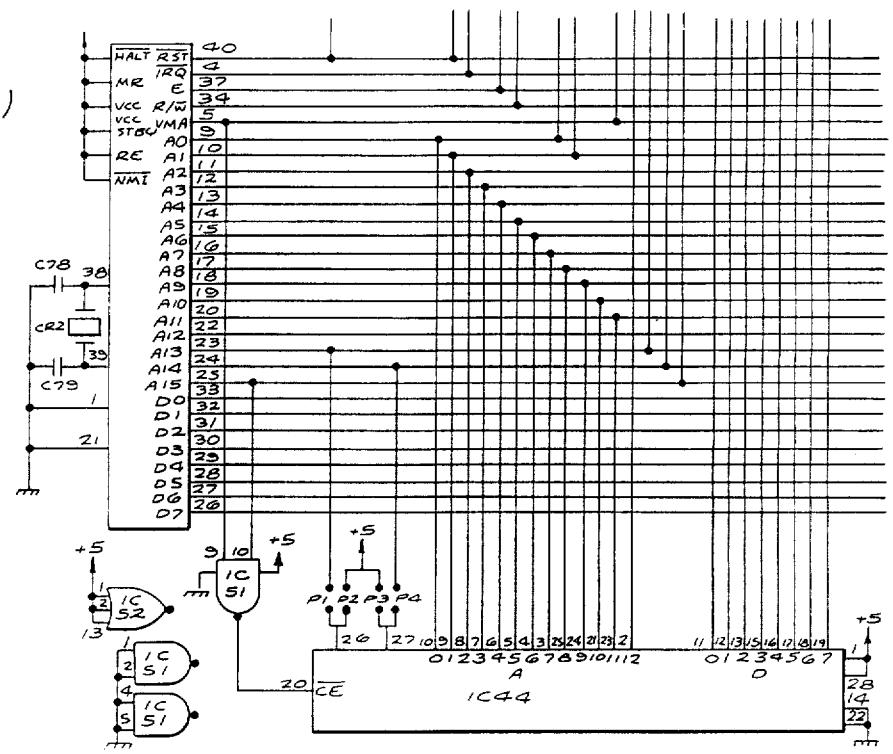
Figure 9:
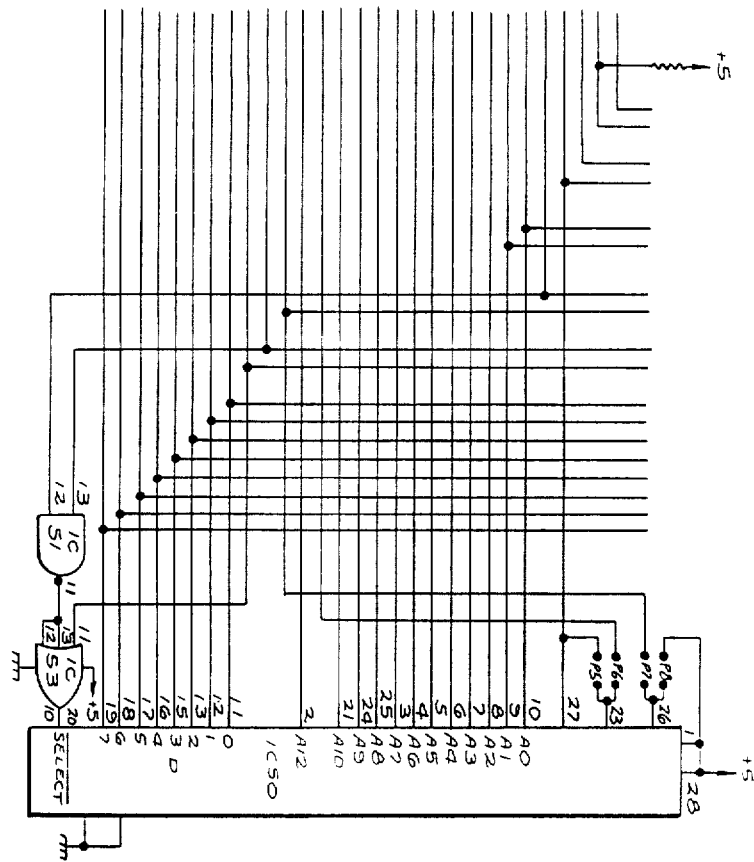

Four part FIG. 9 illustrates the line status monitor card with its microprocessor 90 (IC45), its EPROM 91 (IC44), its RAM 92 (IC50) and its crystal control 93, forming a small computer. Peripheral interface adapter 94 allows the microprocessor 93 to interface with the multiplexer while the interface adapter 95 provides the channels to and from the host computer via tri state data selectors (to 96 (IC43), 97 (IC48) and (FROM gates 98 (IC3)). The card select logic includes 2 four bit digital magnatude comparators 99 (IC42, IC47) which enable communications with the host computer whenever that card has been uniquely selected by a match of the 8 bit card slot identification hardwired to each card slot and the host computers digital card select word.

OPTIONS

Remote Alarm Clearing Option

In FIG. 1, an optical alarm box is shown comprising an auxiliary alarm detection device 17 which may include one or more parallel switch contacts 18. Shown for example, bridging the line of sub station set 17. This may be a "Door open" or other similar alarm detector which physically closes (or opens) a switch 18 to signal an alarm condition. The alarm detection unit of my co-pending patent application comprises such a unit.

Employing this invention, with repeated scanning of the lines, an alarm condition will be repeated as long as the alarm detector switch remains actuated. The logic for the system in such a situation is similar to that of FIG. 3 only differing in that the alarm code has been dialed automatically initiated by closure of switch 18 of FIG. 1.

Regardless of the type of alarm generated, automaic DIAL-IN, OFF-HOOK, etc., the remote alarm clearing option may be used. Employing this option when personnel go to the alarm site, they clear the cause of the alarm and then clear the system of the current alarm by dialing in their authorized PIN number, the time and location of clearance and identity of the clearing party is recorded. Since the time of alarm occurrence was also recorded, personnel response time is obtained automatically. The clearing function of the host computer is illustrated in FIG. 13.

Personnel Tracking Option

Employing this option, each employee with duties in the area served by the system may be assigned a personal identification number (PIN). It typically is a number unused for extensions. Any time the employee dials his PIN from any substation set served by this system, his location is recorded at the monitor station as well as the time of day. This is done by this system without intervention of the central office switch or PBX switchboard.

In its normal use, covered personnel merely dial in their PIN number of the nearest telephone set at any time and their location is recorded at the monitor station. If the personnel is a security guard making rounds in a complex, the system can also be configured to produce an alarm if he becomes overdue at any of his scheduled report-in locations. FIG. 14 illustrates the host computer program flow for this function.

Inactivity Signalling Option

An additional option available employing this invention is to detect as an alarm condition, lack of activity over a predetermined time passed at a particular location. Examples are:
(a) Telephone not OFFHOOK for___time
(b) no ringing condition over___time
(c) no OFFHOOK with dialed pulse over___time
(d) no switch closure 18 on unit 17 for over___time
(e) no switch closure by other sensor over___time In certain cases these criteria may indicate an abnormal, if not an alarm, condition. Since this system scans each line repeatedly and each line has an alarm status table to indicate abnormalities, inactivity can be monitored as well as activity.

The flow diagrams for the host computer for the inactivity monitor is disclosed in FIG. 15. It incorporates intrusion alarm capability a well since activity on premises may represent intrusion when no one is authorized to be on the premises and yet clears an inactivity alarm when someone is authorized to be on the premises.

What is claimed is:

1. A universal telephone line status and reaction system for connection between a central office or a private branch exchange (PBX) and a plurality of telephone substations via respective telephone line pairs comprising:
   a line status monitor connected across the line pairs for each of the plurality of telephone substations;
   said line status monitor including means for examining each of said line pairs to determine status thereof including at least receiver OFF-HOOK, DIALING IN PROGRESS and LINE IN RING condition;
   means for timing receiver off hook duration;
   means for detecting at least one sequence of dialed numbers indicative of an alarm condition; and
   means responsive to an OFF HOOK condition greater than a predetermined time without detection of DIALING IN PROGRESS or LINE IN RING condition for generating a signal indicative of an alarm condition and identifying the substation with the alarm condition; and
   a monitor station coupled to said line status detector for representing an alarm condition for a particular substation.

2. A system in accordance with claim 1 wherein said line status monitor includes means for storing identification of each substation, a preselected OFF-HOOK duration and a plurality of decimal digits indicative of a user dialed alarm code.

3. A system in accordance with claim 1 wherein said line status monitor includes means for storing a line status table for each subscriber station line pair; and
   means responsive to the timing means for examining said line status table to determine if the OFF-HOOK condition timing by said timing means resulted from a LINE IN RING condition prior to generation of an alarm condition signal.

4. A alarm system in accordance with claim 3 wherein said line status monitor includes means responsive to the timing means for examining said line status table to determine if the OFF-HOOK condition is indicative of dialing in progress prior to generation of an alarm condition signal.

5. A system in accordance with claim 1 wherein said line status monitor includes as said means for examining each of said lines comprises scanning means for sequentially sensing the line voltage and presence of audio dialing frequencies of each of said line pairs.

6. A system in accordance with claim 5 wherein said alarm detector unit includes means for multiplexing the output of said scanning means with line pair identification for transmission to said monitor system.

7. An integrated telephone alarm system in accordance with claim 1 wherein said line status monitor includes means for decoding dual tone multifrequency signals, and means for comparing such decoded signals with stored alarm digits.

8. An integrated telephone alarm system in accordance with claim 1 wherein said system includes a microprocessor for storing line status information, OFF-HOOK duration alarm information, alarm code information and for comparing line status information from said line status monitor with said such stored information to determine if an alarm status condition exists.

9. A system in accordance with claim 1 wherein said system includes means for storing individual personnel codes and wherein responsive to detection of such individual code, said monitor station records the time, telephone location and person identification.

10. A system in accordance with claim 9 wherein said system responds to a detection system condition and does not clear an alarm until receipt of a valid personnel code from the substation signalling the alarm condition.

11. A universal telephone line status and reaction system comprising:
    a high impedance line circuit including means for bridging the line circuit across a telephone line;
    voltage detecting means for detecting normal line voltage for OFF-HOOK and LINE IN RING condition;
    a dialing signal detector;
    a timer;
    logic means for indicating an OFF-HOOK condition with no dialing signal pre-set on the line for a predetermined time period as determined from said timer as an alarm condition;
    means for storing a number of preselected digits as an alarm indication;

means responsive to detection of said preselected digits to indicate an alarm combination; and means for recording the line identification, time and alarm condition.

12. A system in accordance with claim 11 wherein said dialing signal detector detects at least one of dial pulse voltage and multifrequence tone dialing signals.

13. A system in accordance with claim 11 wherein said storing means comprises a microprocessor memory.

14. A system in accordance with claim 11 wherein said logic means includes a microprocessor.

15. A system in accordance with claim 11 including means for displaying line identification, time and the alarm condition detected.

16. A system in accordance with claim 15 wherein said storing means include memory for storing substation location and a route to said substation.

17. A method for detecting the status of a telephone line and for utilizing the line for auxiliary information transfer on a maximum interference basis comprising:

monitoring a plurality of telephone lines for RECEIVER OFF HOOK amd PRESELECTED DIGITS DIALED;

storing location information for each line;

timing a RECEIVER OFF HOOK condition;

comparing the time of RECEIVER OFF HOOK against a preselected standard maximum time;

identifying as an alarm condition a RECEIVER OFF HOOK condition exceeding the standard; and indicating the alarm condition, the line and time of occurrence.

18. The method in accordance with claim 17 including:

storing at least one number indicative of an alarm;

monitoring for the presence of the alarm number; and responsive thereto indicating an alarm condition.

19. The method in accordance with claim 17 including:

storing a plurality of numbers associated with particular persons;

clearing the alarm only upon receipt of the number associated with a particular person; and indicating the clearance of the alarm, time and person clearing the alarm.

20. The method in accordance with claim 17 including storing location information for the telephone line; and responsive to an indicated alarm condition at a telephone line, displaying the alarm indication and location information.

21. In a combined telephone and alarm system including a plurality of lines with alarm input devices associated within said lines, computer means coupled to said telephone lines for storing line identification, personnel identification, predetermined digits, and predetermined timed delays;

said computer responding to an OFF-HOOK condition on a telephone line in excess of a preselected time or a preselected dialed number on said line to indicate an alarm condition;

said computer indicating an alarm condition;

means for inputting an alarm clear signal to said computer;

said computer means responding to an alarm clear signal only when accompanied by a preselected personnel identification.

22. The combination in accordance with claim 21 wherein said means for inputting a preselected dialed number comprises a telephone set.

23. The combination in accordance with claim 21 wherein said means for inputting an alarm clear signal comprises a telephone set.

24. The combination in accordance with claim 21 wherein said computer is coupled across said telephone lines between a telephone set and a telephone central office or private branch exchange (PBX).

25. A computer in accordance with claim 21 wherein said computer stores information constituting a time schedule for locations of moving personnel having telephone sets along the route of movement;

said computer operative responsive to a failure to receive a preselected personnel code in a predetermined time from a telephone set on said route indicating an alarm condition.

26. A computer in accordance with claim 21 wherein said computer responsive to a preselected time of no signal inputs a telephone line to indicate an alarm condition.

* * * * *

UNITED STATES PATENT AND TRADEMARK OFFICE
CERTIFICATE OF CORRECTION

PATENT NO. : 4,839,917

DATED : June 13, 1989

INVENTOR(S) : Stewart W. Oliver

Page 1 of 14

It is certified that error appears in the above-identified patent and that said Letters Patent is hereby corrected as shown below:

The title page should be deleted to appear as per attached title page.

Sheets 1-25 of the drawings should be deleted to be replaced with sheets 1-12 as shown on the attached sheets.

Signed and Sealed this

Fifth Day of June, 1990

Attest:

HARRY F. MANBECK, JR.

*Attesting Officer*      *Commissioner of Patents and Trademarks*

United States Patent [19]

Oliver

[11] Patent Number: 4,839,917
[45] Date of Patent: Jun. 13, 1989

[54] UNIVERSAL LINE STATUS MONITORING AND RESPONSE SYSTEM

[76] Inventor: Stewart W. Oliver, 688 Mildred Ave., Venice, Calif. 90291

[21] Appl. No.: 116,066

[22] Filed: Oct. 29, 1987

[51] Int. Cl.[4] .................. G08B 26/00; G08B 1/08; H04M 11/04
[52] U.S. Cl. ........................ 379/45; 379/33; 379/49
[58] Field of Search ............ 379/45, 28, 32, 33, 379/49, 37; 340/518, 653, 660

[56] References Cited

U.S. PATENT DOCUMENTS

| | | | |
|---|---|---|---|
| 2,195,627 | 4/1940 | Lomax et al. | 179/5 |
| 3,571,531 | 3/1971 | Rubin | 179/175.2 |
| 3,917,915 | 11/1975 | Karras | 179/175.2 |
| 4,273,960 | 6/1981 | Fahey et al. | 179/5 |
| 4,692,742 | 9/1987 | Raizen et al. | 379/49 |

Primary Examiner—Stafford D. Schreyer
Attorney, Agent, or Firm—John E. Wagner

[57] ABSTRACT

A system is disclosed for monitoring telephone lines by bridging across each line between a telephone central office or private branch exchange (PBX) and a telephone set. The lines are scanned periodically for OFF-HOOK, DIALING or IN-RING condition to determine line status. OFF-HOOK without DIALING or IN-RING condition for more than a preselected period is considered one form of an alarm condition. Dialing signals of certain predetermined numbers is considered an alarm. A computer is provided to store line status information, preset numbers, personel identification (PIN) numbers and telephone set locations to provide a universal software controlled monitoring of locations, telephone sets and personnel whereever telephone sets are located.

26 Claims, 25 Drawing Sheets

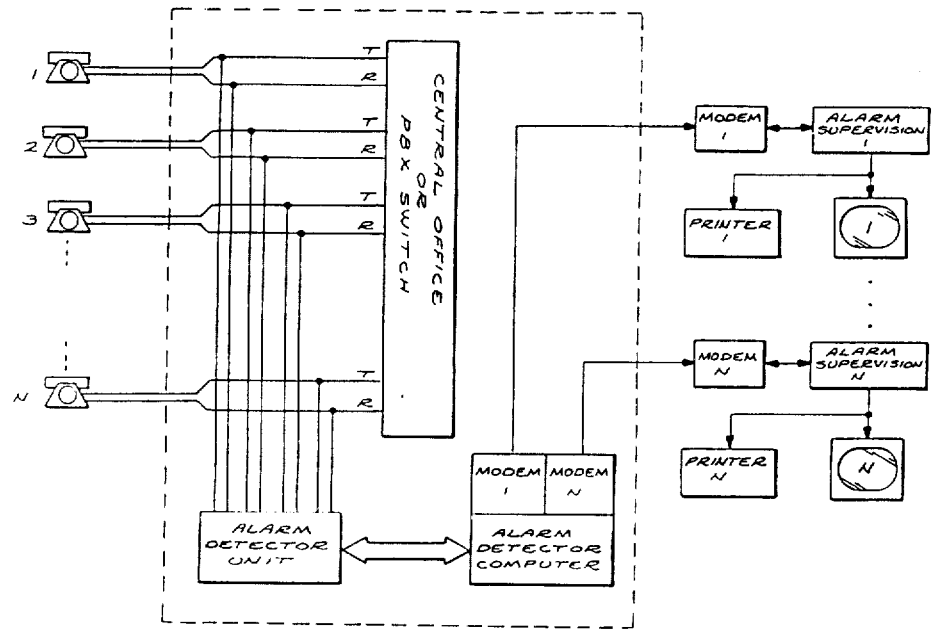

Patent No. 4,839,917